United States Patent
Kobayashi et al.

(10) Patent No.: US 9,826,535 B2
(45) Date of Patent: Nov. 21, 2017

(54) BASE STATION APPARATUS, RADIO COMMUNICATION SYSTEM, AND RADIO COMMUNICATION CONTROLLING METHOD

(71) Applicant: FUJITSU LIMITED, Kawasaki-shi, Kanagawa (JP)

(72) Inventors: Kazuya Kobayashi, Kawasaki (JP); Takato Ezaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 252 days.

(21) Appl. No.: 14/696,833

(22) Filed: Apr. 27, 2015

(65) Prior Publication Data

US 2015/0230233 A1 Aug. 13, 2015

Related U.S. Application Data

(63) Continuation of application No. PCT/JP2012/080298, filed on Nov. 22, 2012.

(51) Int. Cl.
  *G01R 31/08* (2006.01)
  *H04W 72/04* (2009.01)
  *H04L 5/00* (2006.01)

(52) U.S. Cl.
  CPC ........... *H04W 72/048* (2013.01); *H04L 5/001* (2013.01); *H04L 5/0092* (2013.01); *H04W 72/0406* (2013.01); *H04W 72/0453* (2013.01)

(58) Field of Classification Search
  USPC .......................... 370/329, 252, 254, 281, 328
  See application file for complete search history.

(56) References Cited

U.S. PATENT DOCUMENTS

2012/0063302 A1* 3/2012 Damnjanovic ... H04W 56/0045
  370/228
2012/0263060 A1* 10/2012 Suzuki ................ H04W 52/365
  370/252

(Continued)

FOREIGN PATENT DOCUMENTS

JP 2010-178024 A 8/2010
JP 2011-35770 A 2/2011

(Continued)

OTHER PUBLICATIONS

Panasonic, "Details of extension carrier", Agenda Item: 7.2.1.2, 3GPP TSG-RAN WG1 Meeting #59, R1-094498, Jeju, Korea, Nov. 9-13, 2009.

(Continued)

*Primary Examiner* — Phuongchau Ba Nguyen
(74) *Attorney, Agent, or Firm* — Myers Wolin, LLC

(57) ABSTRACT

A processor performs a process that includes decoding, from among a radio signal received by the radio signal receiving apparatus, control data that includes information indicating frequency bands that a mobile station apparatus is capable of dealing with, component carriers and scenarios for carrier aggregation, receiving the decoded control data, calculating, in accordance with the received control data, a transmission-bandwidth adjacency level value indicating a policy on component-carrier allocation to the mobile station apparatus, determining, in accordance with the calculated transmission-bandwidth adjacency level value, a component carrier to be allocated to the mobile station apparatus from among the component carriers and the frequency bands that the mobile station apparatus is capable of dealing with; and generating a transmission signal that includes information indicating the determined component carrier.

15 Claims, 18 Drawing Sheets

(56) References Cited

U.S. PATENT DOCUMENTS

2012/0322455 A1    12/2012  Oh
2013/0322394 A1    12/2013  Ishii et al.

FOREIGN PATENT DOCUMENTS

| JP | 2011-182104 A | 9/2011 |
|---|---|---|
| JP | 2012-169852 A | 9/2012 |
| WO | 2011/016391 A1 | 2/2011 |
| WO | 2011/052312 A1 | 5/2011 |
| WO | 2012/111638 A1 | 8/2012 |

OTHER PUBLICATIONS

NEC, "Details of Carrier Aggregation Signaling", Agenda Item: 7.3.4, 3GPP TSG-RAN WG2 Meeting #67bis, R2-095950, Miyazaki, Japan, Oct. 12-16, 2009.

International Search Report issued for corresponding International Patent Application No. PCT/JP2012/080298, dated Dec. 18, 2012.

Extended European search report with the supplementary European search report and the European search opinion issued for corresponding European Patent Application No. 12888798.1 dated Nov. 6, 2015.

Huawei, "Consideration on UE RF capability in CA", Agenda Item: 3.1.1, R4-102608, 3GPP TSG-RAN WG4 Meeting Ad Hoc 2010 #3, 3rd Generation Partnership Project (3GPP), Bratislava, Slovakia, Jun. 28-Jul. 2, 2010.

Qualcomm Incorporated, "Carrier Aggregation bandwidth combination", R2-120283, 3GPP TSG-RAN2 Meeting #77, 3rd Generation Partnership Project (3GPP), Dresden, Germany, Feb. 6-10, 2012.

Ericsson et al., "Introduction of supported bandwidth combinations for CA", R2-122765, 3GPP TSG-RAN2 Meeting #78, 3rd Generation Partnership Project (3GPP), Prague, Czech Republic, May 21-25, 2012.

* cited by examiner

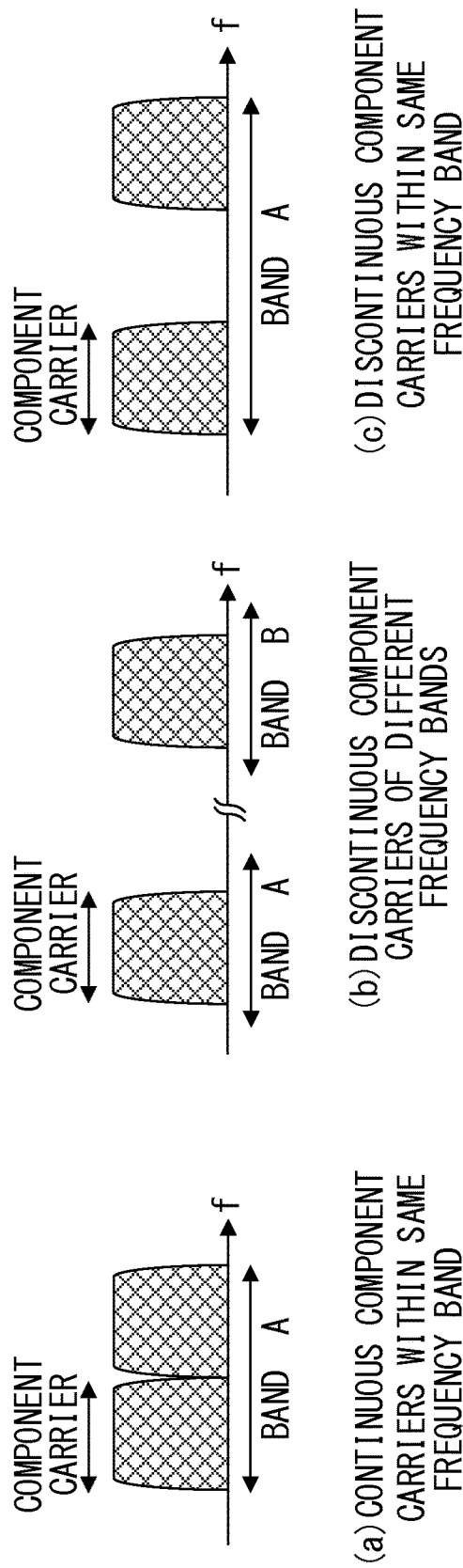
F I G. 1

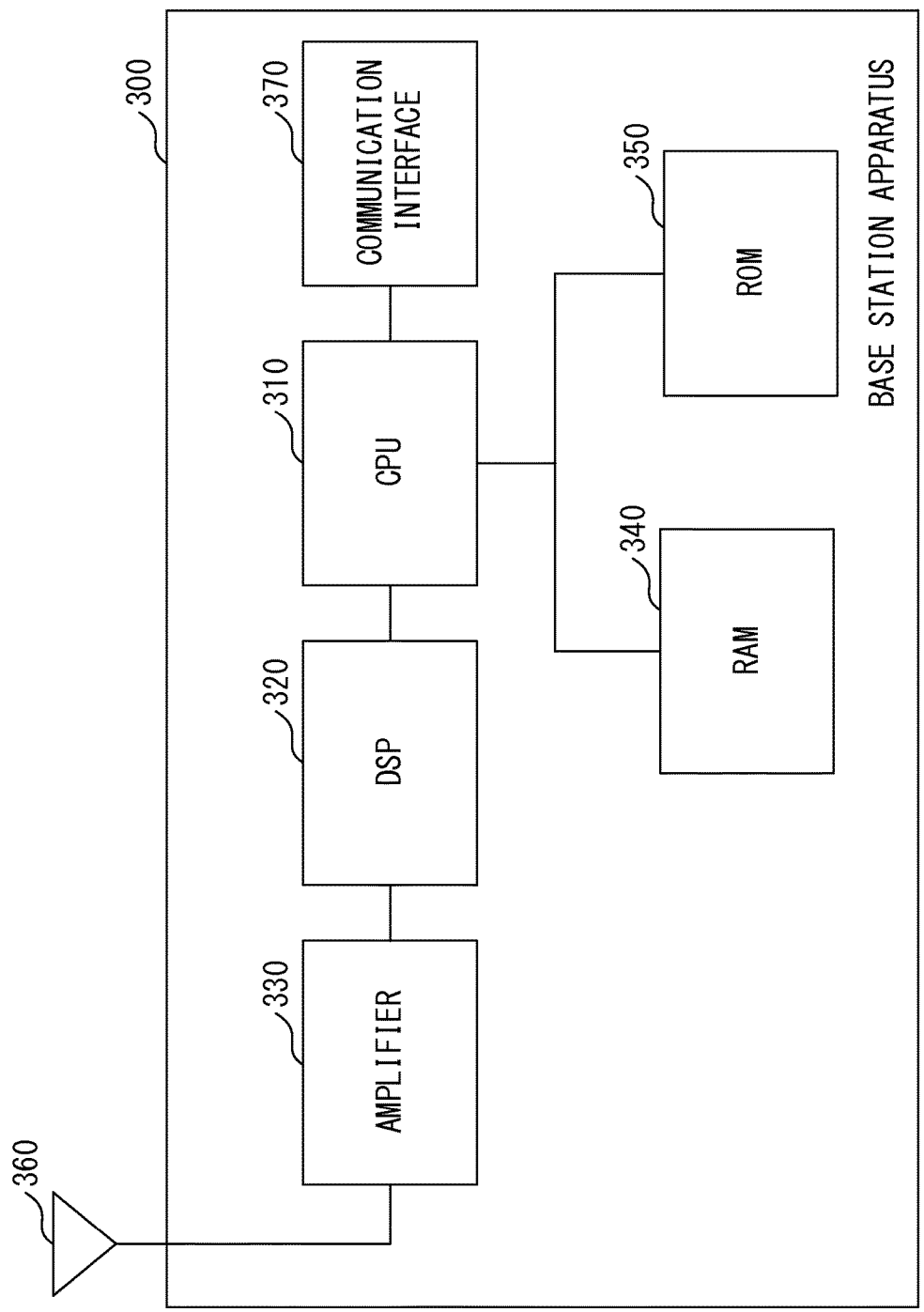
F I G. 4

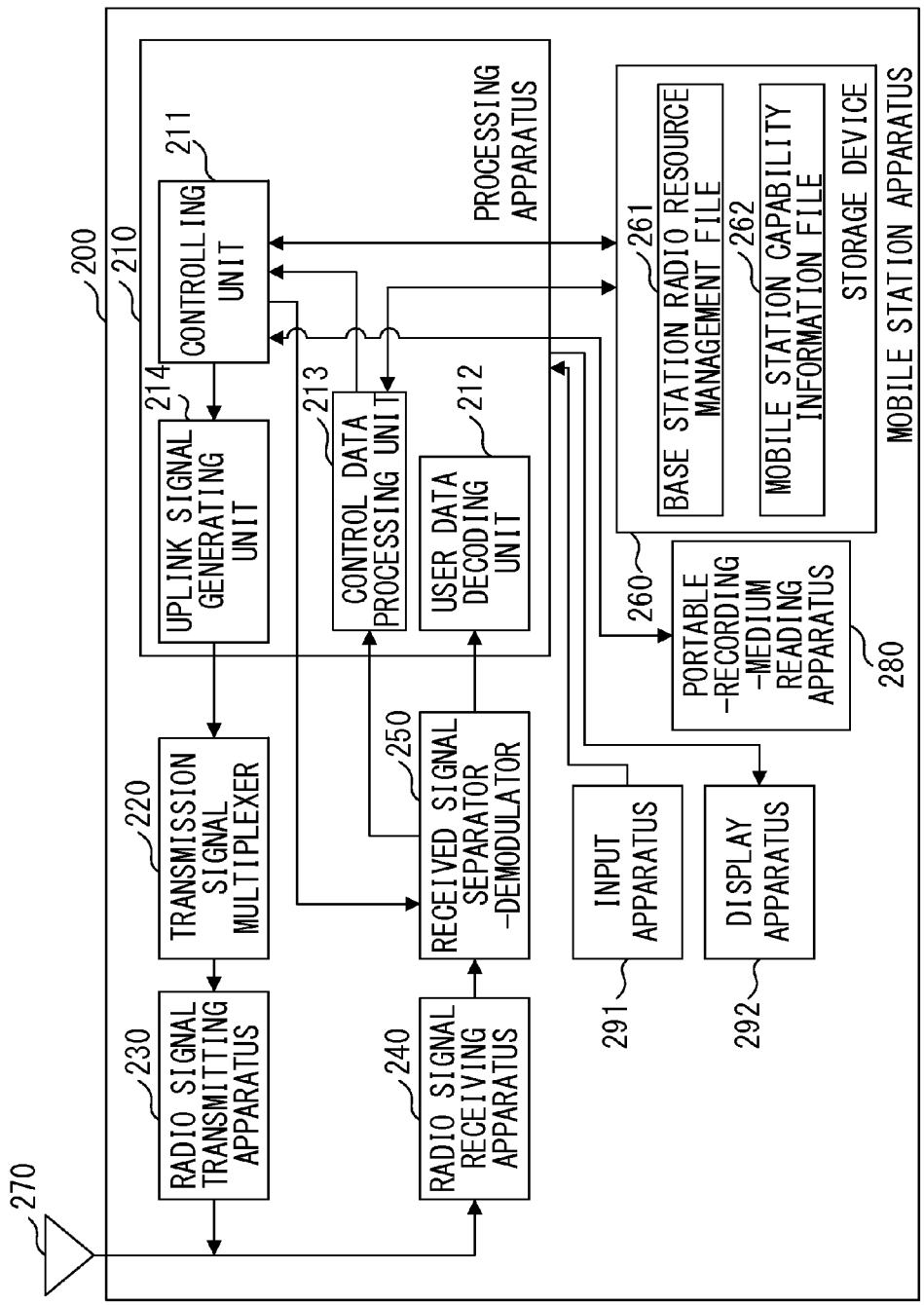
F I G. 5

```
UECapabilityInformation ::=   SEQUENCE {
    rrc-TransactionIdentifier    RRC-TransactionIdentifier,
    criticalExtensions           CHOICE {
        c1                             CHOICE{
            ueCapabilityInformation-r8     UECapabilityInformation-r8-IEs,
        }
        criticalExtensionsFuture       SEQUENCE {}
    }
}
UECapabilityInformation-r8-IEs ::=   SEQUENCE {
    ue-CapabilityRAT-ContainerList    UE-CapabilityRAT-ContainerList,
    nonCriticalExtension              UECapabilityInformation-v8a0-Ies
    OPTIONAL
}

UE-CapabilityRAT-ContainerList ::=SEQUENCE (SIZE (0..maxRAT-Capabilities)) OF
UE-CapabilityRAT-Container UE-CapabilityRAT-Container ::= SEQUENCE {
        rat-Type                      RAT-Type,
        ueCapabilityRAT-Container     OCTET STRING
}
```

F I G. 9

```
UE-EUTRA-Capability ::=                    SEQUENCE {
    phyLayerParameters                         PhyLayerParameters,
    rf-Parameters                              RF-Parameters,
    :
}

UE-EUTRA-Capability-v1020-IEs ::=          SEQUENCE {
    ue-Category-v1020                          NTEGER (6..8)             OPTIONAL,
    phyLayerParameters-v1020                   PhyLayerParameters-v1020  OPTIONAL,
    :
}

PhyLayerParameters-v1020 ::=               SEQUENCE {
    crossCarrierScheduling-r10                 ENUMERATED {supported}    OPTIONAL,
    simultaneousPUCCH-PUSCH-r10                ENUMERATED {supported}    OPTIONAL,
    multiClusterPUSCH-WithinCC-r10             ENUMERATED {supported}    OPTIONAL,
    nonContiguousUL-RA-WithinCC-List-r10       NonContiguousUL-RA-WithinCC-List-r10  OPTIONAL
}

NonContiguousUL-RA-WithinCC-List-r10 ::=   SEQUENCE (SIZE (1..maxBands)) OF NonContiguousUL-RA-WithinCC-r10
NonContiguousUL-RA-WithinCC-r10 ::=        SEQUENCE {
    nonContiguousUL-RA-WithinCC-Info-r10       ENUMERATED {supported}    OPTIONAL
}

RF-Parameters ::=                          SEQUENCE {
    supportedBandListEUTRA                     SupportedBandListEUTRA
}

RF-Parameters-v1020 ::=                    SEQUENCE {
    supportedBandCombination-r10               SupportedBandCombination-r10
}
```

FIG. 10A

```
SupportedBandCombination-r10 ::= SEQUENCE (SIZE (1..maxBandComb-r10)) OF BandCombinationParameters-r10

BandCombinationParameters-r10 ::= SEQUENCE (SIZE (1..maxSimultaneousBands-r10)) OF BandParameters-r10

BandParameters-r10 ::= SEQUENCE {
    bandEUTRA-r10        INTEGER (1..64),
    bandParametersUL-r10 BandParametersUL-r10    OPTIONAL,
    bandParametersDL-r10 BandParametersDL-r10    OPTIONAL
}

BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10      CA-BandwidthClass-r10,
    supportedMIMO-CapabilityUL-r10 MIMO-CapabilityUL-r10  OPTIONAL
}

BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10      CA-BandwidthClass-r10,
    supportedMIMO-CapabilityDL-r10 MIMO-CapabilityDL-r10  OPTIONAL
}

CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}
SupportedBandListEUTRA ::= SEQUENCE (SIZE (1..maxBands)) OF SupportedBandEUTRA
SupportedBandEUTRA ::= SEQUENCE {
    bandEUTRA   INTEGER (1..64),
    halfDuplex  BOOLEAN
}
```

F I G. 1 0 B

| TRANSMISSION-BANDWIDTH ADJACENCY LEVEL VALUE = X(ABC) | POLICY ON ALLOCATION INDICATED BY TRANSMISSION-BANDWIDTH ADJACENCY LEVEL VALUE |
|---|---|
| TRANSMISSION-BANDWIDTH ADJACENCY LEVEL VALUE = 0(000): | CA IS UNAVAILABLE. |
| TRANSMISSION-BANDWIDTH ADJACENCY LEVEL VALUE = 1(001): | MULTIPLE CC'S IN SAME BAND ARE UNAVAILABLE, MULTIPLE BANDS ARE UNAVAILABLE, DISCONTINUOUS CC'S IN SAME BAND ARE AVAILABLE |
| TRANSMISSION-BANDWIDTH ADJACENCY LEVEL VALUE = 2(010): | MULTIPLE CC'S IN SAME BAND ARE UNAVAILABLE, MULTIPLE BANDS ARE AVAILABLE, DISCONTINUOUS CC'S IN SAME BAND ARE UNAVAILABLE |
| TRANSMISSION-BANDWIDTH ADJACENCY LEVEL VALUE = 3(011): | MULTIPLE CC'S IN SAME BAND ARE UNAVAILABLE, MULTIPLE BANDS ARE AVAILABLE, DISCONTINUOUS CC'S IN SAME BAND ARE AVAILABLE |
| TRANSMISSION-BANDWIDTH ADJACENCY LEVEL VALUE = 4(100): | MULTIPLE CC'S IN SAME BAND ARE AVAILABLE, MULTIPLE BANDS ARE UNAVAILABLE, DISCONTINUOUS CC'S IN SAME BAND ARE UNAVAILABLE |
| TRANSMISSION-BANDWIDTH ADJACENCY LEVEL VALUE = 5(101): | MULTIPLE CC'S IN SAME BAND ARE AVAILABLE, MULTIPLE BANDS ARE UNAVAILABLE, DISCONTINUOUS CC'S IN SAME BAND ARE AVAILABLE |
| TRANSMISSION-BANDWIDTH ADJACENCY LEVEL VALUE = 6(110): | MULTIPLE CC'S IN SAME BAND ARE AVAILABLE, MULTIPLE BANDS ARE AVAILABLE, DISCONTINUOUS CC'S IN SAME BAND ARE UNAVAILABLE |
| TRANSMISSION-BANDWIDTH ADJACENCY LEVEL VALUE = 7(111): | MULTIPLE CC'S IN SAME BAND ARE AVAILABLE, MULTIPLE BANDS ARE AVAILABLE, DISCONTINUOUS CC'S IN SAME BAND ARE AVAILABLE |

A: USE OF CONTINUOUS CC'S IN SAME FREQUENCY BAND (AVAILABLE:1,UNAVAILABLE:0)
B: USE OF DISCONTINUOUS CC'S OF DIFFERENT FREQUENCY BANDS (AVAILABLE:1, UNAVAILABLE:0)
C: USE OF DISCONTINUOUS CC'S IN SAME FREQUENCY BAND (AVAILABLE:1,UNAVAILABLE:0)

F I G. 1 2

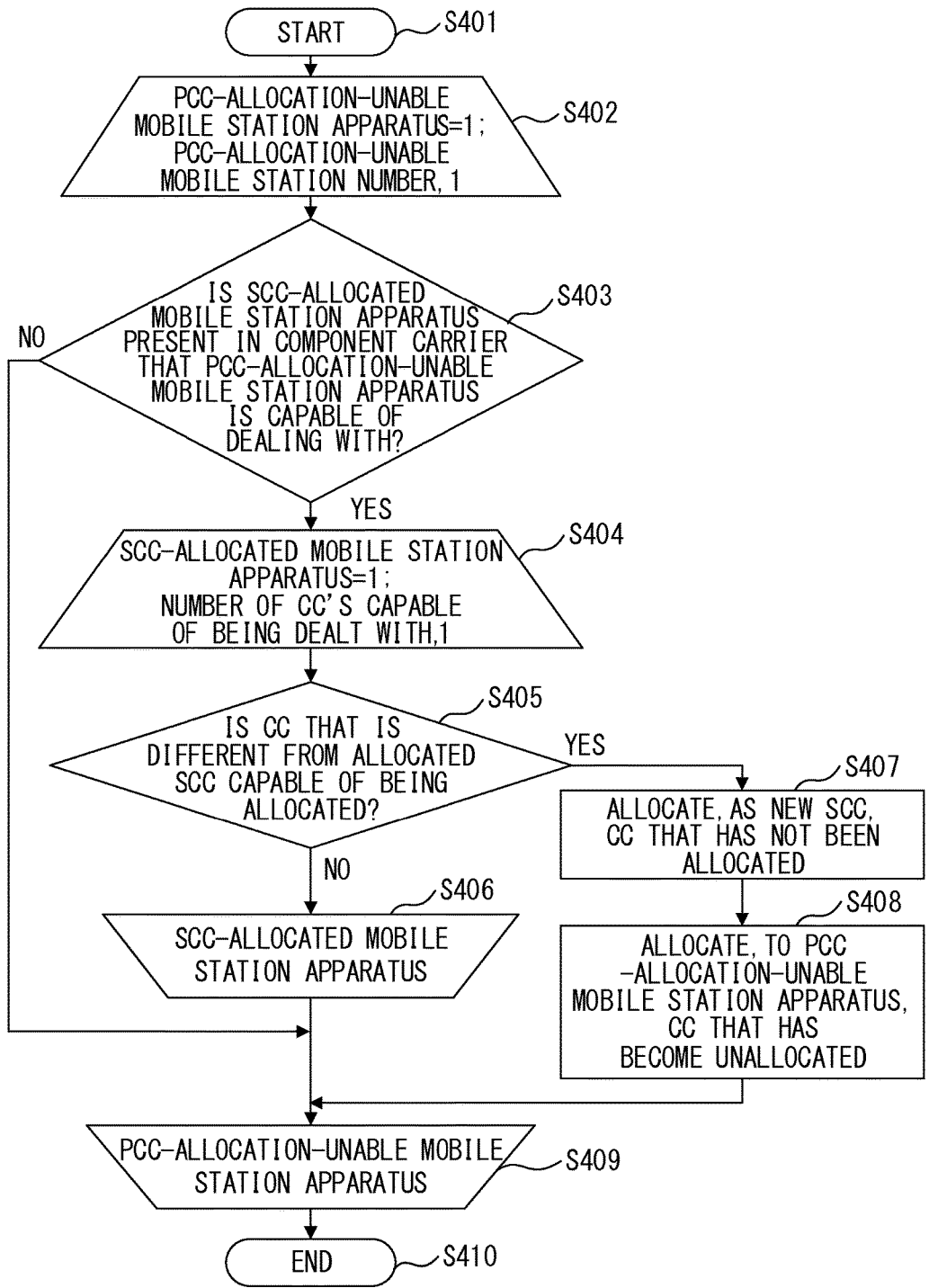
F I G. 1 4

BASE STATION APPARATUS, RADIO COMMUNICATION SYSTEM, AND RADIO COMMUNICATION CONTROLLING METHOD

CROSS-REFERENCE TO RELATED APPLICATION

This application is a continuation application of International Application PCT/JP2012/080298 filed on Nov. 22, 2012 and designated the U.S., the entire contents of which are incorporated herein by reference.

FIELD

The embodiments discussed herein are related to a base station apparatus, a radio communication system, and a radio communication controlling method.

BACKGROUND

In the field of radio communication technology, communication techniques have been studied and developed for enabling higher-speed and higher-capacity data communications between mobile station apparatuses and base station apparatuses.

In the Third Generation Partnership Project (3GPP), which is a standard-setting organization for a mobile radio communication scheme, the Long Term Evolution (LTE), i.e., a 3.9-generation radio communication scheme is standardized. Some carriers have already started providing LTE-based radio communication services. The 3GPP is also thinking of standardizing LTE-Advanced (LTE-A) as a succeeding radio communication scheme compatible with LTE. Note that LTE is also called the Evolved Universal Terrestrial Radio Access (E-UTRA) and that LTE-A is also called the Advanced E-UTRA.

To enable higher-speed and higher-capacity data communications, LTE-A is scheduled to allow communications based on greater frequency bandwidths than those in LTE, i.e., a scheme in which communications are performed using carriers with a maximum frequency bandwidth of 20 MHz.

Specifically, LTE-A defines carrier signals with a frequency bandwidth used in LTE as Component Carriers (CC), thereby enabling communications with a greater frequency bandwidth to be performed using a plurality of component carriers simultaneously. Such a technology, i.e., a technology that enables broadband transmission using a plurality of component carriers simultaneously, is called Carrier Aggregation (CA).

In a prior art, a base station apparatus allocates appropriate wireless resources to a mobile station apparatus according to mobile station component carrier information received from the mobile station apparatus, including wireless parameters.

In another prior art, in an LTE-A system which performs carrier aggregation, in the continuous allocating of bandwidths to mobile stations, a base station reports, to the mobile stations, VRB ($N_{start}$) of information on a bandwidth that starts to be used and the number $N_{length}$ of PRBs in use.

Patent document 1: Japanese Laid-open Patent Publication No. 2011-182104

Patent document 2: Japanese Laid-open Patent Publication No. 2010-178024

SUMMARY

According to an aspect of the embodiments, a base station apparatus includes a radio signal receiving apparatus that receives a radio signal transmitted from a mobile station apparatus, a radio signal transmitting apparatus, and a processor. The processor performs a process that includes decoding, from among the radio signal received by the radio signal receiving apparatus, control data that includes information indicating frequency bands that the mobile station apparatus is capable of dealing with, component carriers and scenarios for carrier aggregation, receiving the decoded control data, calculating, in accordance with the received control data, a transmission-bandwidth adjacency level value indicating a policy on component-carrier allocation to the mobile station apparatus, determining, in accordance with the calculated transmission-bandwidth adjacency level value, a component carrier to be allocated to the mobile station apparatus from among the component carriers and the frequency bands that the mobile station apparatus is capable of dealing with, and generating a transmission signal that includes information indicating the determined component carrier. The radio signal transmitting apparatus transmits the generated transmission signal to the mobile station apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of scenarios for carrier aggregation;

FIG. 4 is an exemplary hardware configuration diagram of a base station apparatus in accordance with a first embodiment;

FIG. 5 is a schematic configuration diagram of abase station apparatus in accordance with a first embodiment;

FIG. 9 is an exemplary diagram of a mobile station capability message;

FIGS. 10A and 10B are exemplary diagrams of the configuration of UE-EUTRA-Capability;

FIG. 12 is an exemplary diagram of policies on component-carrier allocation indicated by transmission-bandwidth adjacency level values;

FIG. 14 is an exemplary diagram of a component-carrier reallocation process flow in accordance with a first embodiment;

DESCRIPTION OF EMBODIMENTS

The following will describe embodiments in detail with reference to the drawings. It should be noted that the described embodiments are not to be considered to be exclusive but may be combined with each other. Processes and processing flows of the individual embodiments are illustrative. It should also be noted that, if necessary, such processes can be replaced with similar processes, further processes may be added thereto, and an order in which such processes are performed may be changed.

First Embodiment

As described above, use of LTE-A, which achieves broadband transmission based on carrier aggregation, as a succeeding radio communication scheme compatible with LTE has been thought of. Putting LTE-A into practical use leads to simultaneous presence of both mobile station apparatuses adapted to LTE and mobile station apparatuses adapted to LTE-A and may lead to a transient presence of a radio communication system in which these mobile station apparatuses communicate with the same base station apparatus.

Accordingly, in such a transient radio communication system, the base station apparatus needs to control allocation of radio resources in accordance with the communication capabilities of connection-target mobile station apparatuses, e.g., in accordance with whether the mobile station apparatuses are capable of performing carrier aggregation.

Even when a connection-target mobile station apparatus is capable of performing carrier aggregation, the base station apparatus needs to control allocation of radio resources in consideration of the scenario for the carrier aggregation the mobile station apparatus is capable of dealing with. FIG. 1 is an explanatory diagram of scenarios for carrier aggregation. As depicted in FIG. 1, the scenarios for carrier aggregation include, for example, (a) allocation of continuous component carriers within the same frequency band, (b) allocation of component carriers of different frequency bands, and (c) allocation of discontinuous component carriers within the same frequency band.

In some cases, all component carriers that a connection-target mobile station apparatus is capable of dealing with have already been allocated to other mobile station apparatuses. In such cases, a mobile station apparatus needs to control allocation of radio resources so as to secure component carriers to be allocated to the connection-target mobile station apparatus.

In view of at least one of the necessities described above, in a radio communication system in accordance with a first embodiment, a base station apparatus performs control for allocating radio resources in accordance with the communication capabilities of individual connection-target mobile station apparatuses, e.g., in accordance with whether a connection-target mobile station apparatus is capable of performing carrier aggregation, and in accordance with what scenario for carrier aggregation the mobile station apparatus is capable of dealing with.

Figure 2:
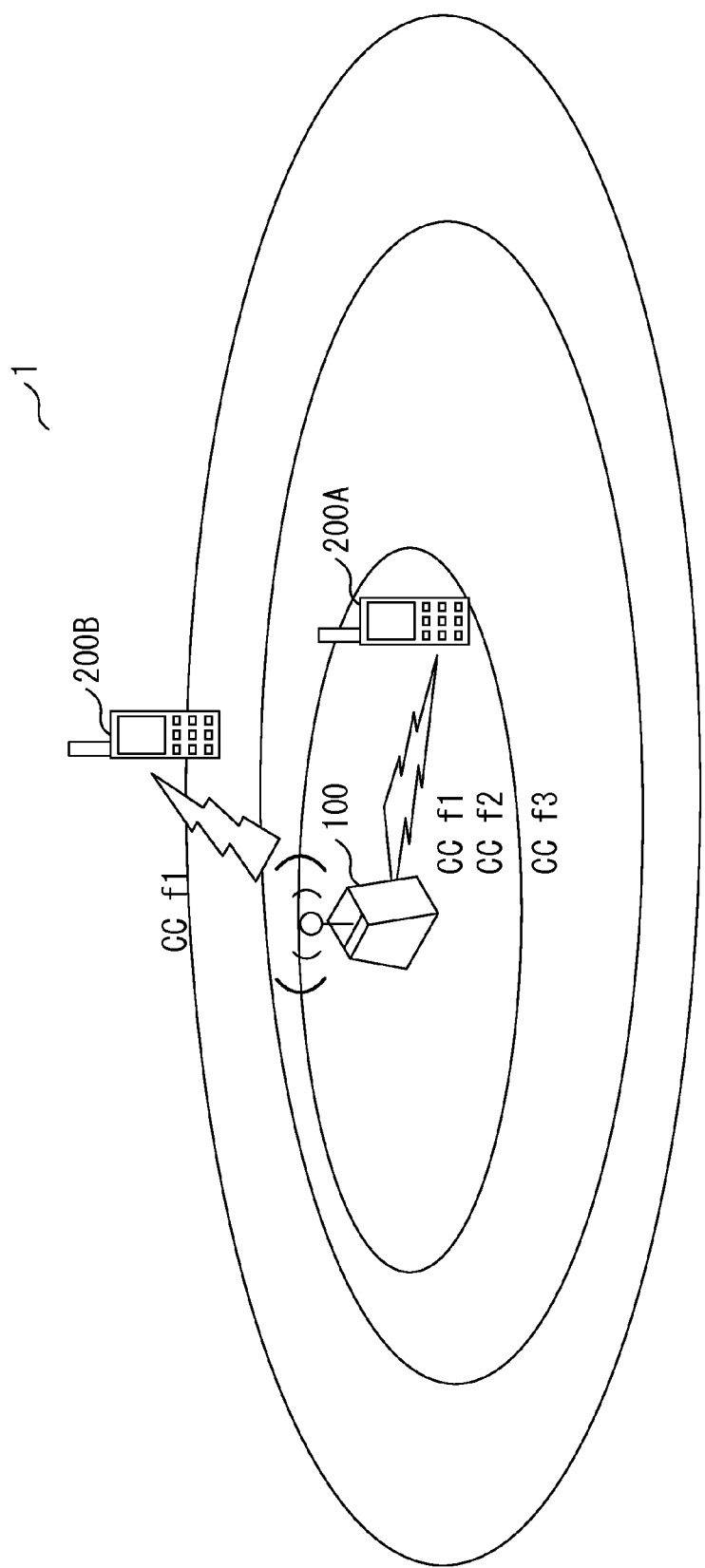
FIG. 2 is a configuration diagram of a radio communication system in accordance with an embodiment.

FIG. 2 is a configuration diagram of a radio communication system in accordance with an embodiment.

A radio communication system 1 depicted in FIG. 2 includes a base station apparatus 100, a first mobile station apparatus 200A, and a second mobile station apparatus 200B. Although FIG. 2 depicts two mobile station apparatuses, the radio communication system 1 in accordance with the embodiment may include any number of mobile station apparatuses. Both the first mobile station apparatus 200A and the second mobile station apparatus 200B will hereinafter be referred to as mobile station apparatuses 200 when the first mobile station apparatus 200A and the second mobile station apparatus 200B are not distinguished from each other.

Upon receipt of a connection request from a mobile station apparatus 200 within a communication area, the base station apparatus 100 allocates an appropriate component carrier in accordance with the communication capability of the mobile station apparatus 200 and communicates with the mobile station apparatus 200.

The first mobile station apparatus 200A and the second mobile station apparatus 200B communicate with the base station apparatus 100 in accordance with different communication schemes compatible with each other. The first mobile station apparatus 200A is, for example, a mobile station apparatus adapted to LTE-A and capable of performing a broadband communication with the base station apparatus 100 using a plurality of component carriers through carrier aggregation. The second mobile station apparatus 200B is, for example, a mobile station apparatus adapted to LTE, and communicates with the base station apparatus 100 using one component carrier. Each of the mobile station apparatuses 200 has, as portions of mobile station capability information (UE capability information), information on the availability of carrier aggregation and information on a scenario for carrier aggregation that is capable of being dealt with.

Figure 3:
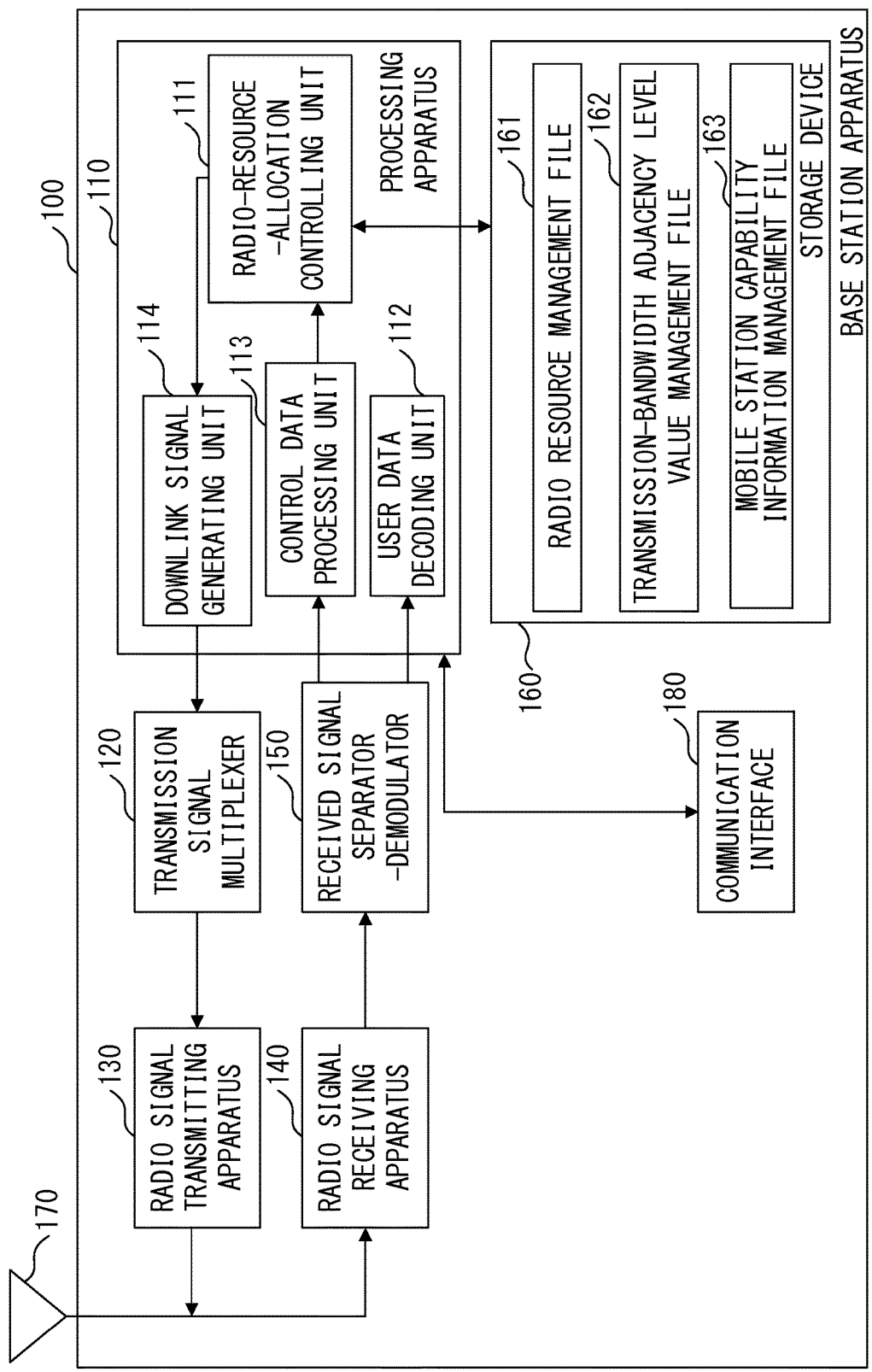
FIG. 3 is a schematic configuration diagram of abase station apparatus in accordance with a first embodiment.

FIG. 3 is a schematic configuration diagram of abase station apparatus in accordance with the first embodiment.

As depicted in FIG. 3, the base station apparatus 100 includes a processing apparatus 110, a transmission signal multiplexer 120, a radio signal transmitting apparatus 130, a radio signal receiving apparatus 140, a received signal separator-demodulator 150, a storage device 160, an antenna 170, and a communication interface 180. The processing apparatus 110 includes a radio-resource allocation controlling unit 111, a user data decoding unit 112, a control data processing unit 113, and a downlink signal generating unit 114. The storage device 160 includes a radio resource management file 161, a transmission-bandwidth adjacency level value management file 162, and a mobile station capability information management file 163.

The radio signal receiving apparatus 140 receives an uplink signal transmitted from the mobile station apparatus 200 via the antenna 170. An uplink signal is a radio signal transmitted from the mobile station apparatus 200 to the base station apparatus 100.

The received signal separator-demodulator 150 separates the uplink signal received by the radio signal receiving apparatus 140 in accordance with a component carrier used for the transmission by the mobile station apparatus 200, and demodulates the uplink signal for each separated component carrier.

The user data decoding unit 112 decodes user data included in the uplink signal separated and demodulated by the received signal separator-demodulator 150.

The control data processing unit 113 decodes and transmits control data included in the uplink signal separated and demodulated by the received signal separator-demodulator 150 to the radio-resource allocation controlling unit 111.

The control data decoded by the control data processing unit 113 includes data on mobile station capability information of the mobile station apparatus 200. The data on mobile station capability information of the mobile station apparatus 200 is recorded in the mobile station capability information management file 163 within the storage device 160.

Mobile station capability information included in control data includes information on a frequency band and component carrier capable of being allocated to the mobile station apparatus 200.

Mobile station capability information includes, for both an uplink signal and a downlink signal, information on a scenario for carrier aggregation that the mobile station apparatus 200 is capable of dealing with. A downlink signal is a radio signal transmitted from the base station apparatus 100 to the mobile station apparatus 200. Information on the scenario for carrier aggregation is information on allocation of continuous component carriers within the same frequency band and allocation of component carriers of different frequency bands, and information indicating whether individual discontinuous component carriers within the same frequency band are capable of being allocated.

Control data decoded by the control data processing unit 113 may include data on a radio communication quality for each component carrier measured for a downlink signal by the mobile station apparatus 200.

The control data processing unit 113 estimates, from an uplink signal received from the mobile station apparatus 200, the radio communication quality of the uplink signal for each component carrier. The control data processing unit 113 transmits data on the estimated radio communication quality of the uplink signal to the radio-resource allocation controlling unit 111.

For every connection-target mobile station apparatus 200 within a communication area of the base station apparatus 100, the radio-resource allocation controlling unit 111 performs control for allocating radio resources in consideration of, for example, the communication capability of the mobile station apparatus 200, the radio communication quality for each component carrier, and the channel fluctuation situation. That is, the radio-resource allocation controlling unit 111 dynamically allocates a downlink channel from the base station apparatus 100 to each mobile station apparatus 200 and an uplink channel from each mobile station apparatus 200 to the base station apparatus 100.

In the first embodiment, the radio-resource allocation controlling unit 111 calculates a transmission-bandwidth adjacency level value for each mobile station apparatus 200 according to mobile station capability information received from the control data processing unit 113. The calculated transmission-bandwidth adjacency level value indicates whether the mobile station apparatus 200 is capable of dealing with carrier aggregation, and indicates a carrier aggregation whose scenario is capable of being dealt with by the mobile station apparatus 200. That is, a transmission-bandwidth adjacency level value indicates policies on component-carrier allocation to the mobile station apparatus 200.

In particular, the radio-resource allocation controlling unit 111 calculates a transmission-bandwidth adjacency level value for an uplink signal using mobile station capability information related to the scenario of a carrier aggregation capable of being dealt with for the uplink signal. The radio-resource allocation controlling unit 111 also calculates a transmission-bandwidth adjacency level value for a downlink signal using mobile station capability information related to the scenario of a carrier aggregation capable of being dealt with for the downlink signal.

The radio-resource allocation controlling unit 111 stores the transmission-bandwidth adjacency level value calculated for each mobile station apparatus 200 in the transmission-bandwidth adjacency level value management file 162 within the storage device 160.

The radio-resource allocation controlling unit 111 reads the radio resource management file 161 stored in the storage device 160. The radio resource management file 161 includes data on frequency bands and component carriers that the base station apparatus 100 is capable of allocating, and data on the allocation situation of component carriers to mobile station apparatuses 200.

In accordance with a transmission-bandwidth adjacency level value, the radio-resource allocation controlling unit 111 extracts component carriers of a downlink signal as candidates for allocation to a mobile station apparatus 200 from the component carriers within the radio resource management file 161. In accordance with, for example, the channel fluctuation situation and the radio communication quality of a downlink signal for each component carrier, the radio-resource allocation controlling unit 111 determines a component carrier of the downlink signal to be allocated to the mobile station apparatus 200 from among the component carriers extracted as candidates for allocation. The radio-resource allocation controlling unit 111 reflects a result of a determination on allocation of the component carrier in the radio resource management file 161.

In accordance with the transmission-bandwidth adjacency level value, the radio-resource allocation controlling unit 111 also extracts component carriers of an uplink signal as candidates for allocation to the mobile station apparatus 200 from the component carriers within the radio resource management file 161. In accordance with, for example, the channel fluctuation situation and the radio communication quality of an uplink signal for each component carrier, the radio-resource allocation controlling unit 111 determines a component carrier of the uplink signal to be allocated to the mobile station apparatus 200 from among the component carriers extracted as candidates for allocation. The radio-resource allocation controlling unit 111 reflects a result of a determination on allocation of the component carrier in the radio resource management file 161.

The downlink signal generating unit 114 generates a downlink signal to be transmitted from the base station apparatus 100 to the mobile station apparatus 200. The generated downlink signal may include a control signal that includes data indicating the component carrier that the radio-resource allocation controlling unit 111 has determined to allocate.

The transmission signal multiplexer 120 multiplexes the downlink signal generated by the downlink signal generating unit 114 with the component carrier of the downlink signal determined by the radio-resource allocation controlling unit 111.

The radio signal transmitting apparatus 130 transmits the downlink signal multiplexed by the transmission signal multiplexer 120 to the mobile station apparatus 200 via the antenna 170.

The processing apparatus 110 transmits, via the communication interface 180, control data and user data to and receives control data and user data from host apparatuses (not illustrated) for the base station apparatus 100, e.g., Mobility Management Entity (MME) and Serving Gateway (S-GW).

FIG. 4 is an exemplary hardware configuration diagram of a base station apparatus in accordance with the first embodiment.

The processing apparatus 110 depicted in FIG. 3 corresponds to, for example, a Central Processing Unit (CPU) 310 of a base station apparatus 300 depicted in FIG. 4. The transmission signal multiplexer 120, the radio signal transmitting apparatus 130, the radio signal receiving apparatus 140, and the received signal separator-demodulator 150 correspond to, for example, a Digital Signal Processor (DSP) 320 and an amplifier 330. The storage device 160 corresponds to, for example, a Random Access Memory (RAM) 340 and a Read Only Memory (ROM) 350. The antenna 170 corresponds to, for example, an antenna 360. The communication interface 180 corresponds to, for example, a communication interface 370.

FIG. 5 is a schematic configuration diagram of a base station apparatus in accordance with the first embodiment.

As depicted in FIG. 5, the mobile station apparatus 200 includes a processing apparatus 210, a transmission signal multiplexer 220, a radio signal transmitting apparatus 230, a radio signal receiving apparatus 240, a received signal separator-demodulator 250, a storage device 260, an antenna 270, a portable-recording-medium reading apparatus 280, an input apparatus 291, and a display apparatus 292. The processing apparatus 210 includes a controlling unit 211, a user data decoder 212, a control data processing unit 213, and an uplink signal generating unit 214. The storage device 260 includes a base station radio resource management file 261 and a mobile station capability information file 262.

The radio signal receiving apparatus 240 receives a downlink signal transmitted from the base station apparatus 100 via the antenna 270.

The received signal separator-demodulator 250 separates the uplink signal received by the radio signal receiving apparatus 240 in accordance with a component carrier determined by the base station apparatus 100, and demodulates the downlink signal for each separated component carrier.

The user data decoder 212 decodes user data included in the downlink signal separated and demodulated by the received signal separator-demodulator 250.

The control data processing unit 213 decodes and transmits control data included in the downlink signal separated and demodulated by the received signal separator-demodulator 250 to the controlling unit 211.

The control data decoded by the control data processing unit 213 may include data indicating respective component carriers determined by the base station apparatus 100 for the uplink signal and the downlink signal.

The control data decoded by the control data processing unit 213 may include data on a frequency band and component carrier that the base station apparatus 100 is capable of allocating. The control data processing unit 213 transmits these pieces of data to the controlling unit 211 and stores them in the base station radio resource management file 261 of the storage device 260.

In addition, the control data decoded by the control data processing unit 213 may include parameter data for measuring the radio communication quality of the downlink signal. The parameter data includes a list of component carriers that are measurement objects, and data on a time at which a result of a measurement is reported to the base station apparatus. In accordance with these pieces of parameter data, the control data processing unit 213 measures the radio communication quality of the downlink signal.

The mobile station capability information file 262 includes data on mobile station capability information of the mobile station apparatus 200. The mobile station capability information includes information on a frequency band and component carrier that are capable of being allocated to the mobile station apparatus 200. Mobile station capability information includes, for both an uplink signal and a downlink signal, information on a scenario for carrier aggregation that the mobile station apparatus 200 is capable of dealing with.

Data on the mobile station capability information may be written to the mobile station capability information file 262 during the fabrication of the mobile station apparatus 200.

Data on mobile station capability information written during the fabrication may be rewritten after the mobile station apparatus 200 starts to be operated. For example, the controlling unit 211 reads, via the portable-recording-medium reading apparatus 280, data on mobile station capability information recorded in a portable recording medium such as a flash memory. The controlling unit 211 replaces data within the mobile station capability information file 262 with the data on mobile station capability information that has been read.

In accordance with control data received from the control data processing unit 213, the controlling unit 211 controls an operation of the transmission signal multiplexer 220 in such a manner as to multiplex the uplink signal with the component carrier determined by the base station apparatus 100. In accordance with control data received from the control data processing unit 213, the controlling unit 211 controls an operation of the received signal separator-demodulator 250 in such a manner as to separate and demodulate a downlink signal received from the base station apparatus 100.

The uplink signal generating unit 214 generates an uplink signal to be transmitted from the mobile station apparatus 200 to the base station apparatus 100. The generated uplink signal may include data on mobile station capability information. A generated transmission signal may include data on the radio communication quality of the downlink signal measured by the control data processing unit 213.

In accordance with control performed by the controlling unit 211, the transmission signal multiplexer 220 multiplexes the uplink signal generated by the uplink signal generating unit 214 with the component carrier determined by the base station apparatus 100.

The radio signal transmitting apparatus 230 transmits the uplink signal multiplexed by the transmission signal multiplexer 220 to the base station apparatus 100 via the antenna 270.

The input apparatus 291 is an apparatus used by a user to input instructions to the mobile station apparatus 200, e.g., a keyboard, touch pad, or mouse. The display apparatus 292 is an apparatus that displays a result of processing performed by the processing apparatus 210, e.g., a liquid crystal display.

Figure 6:
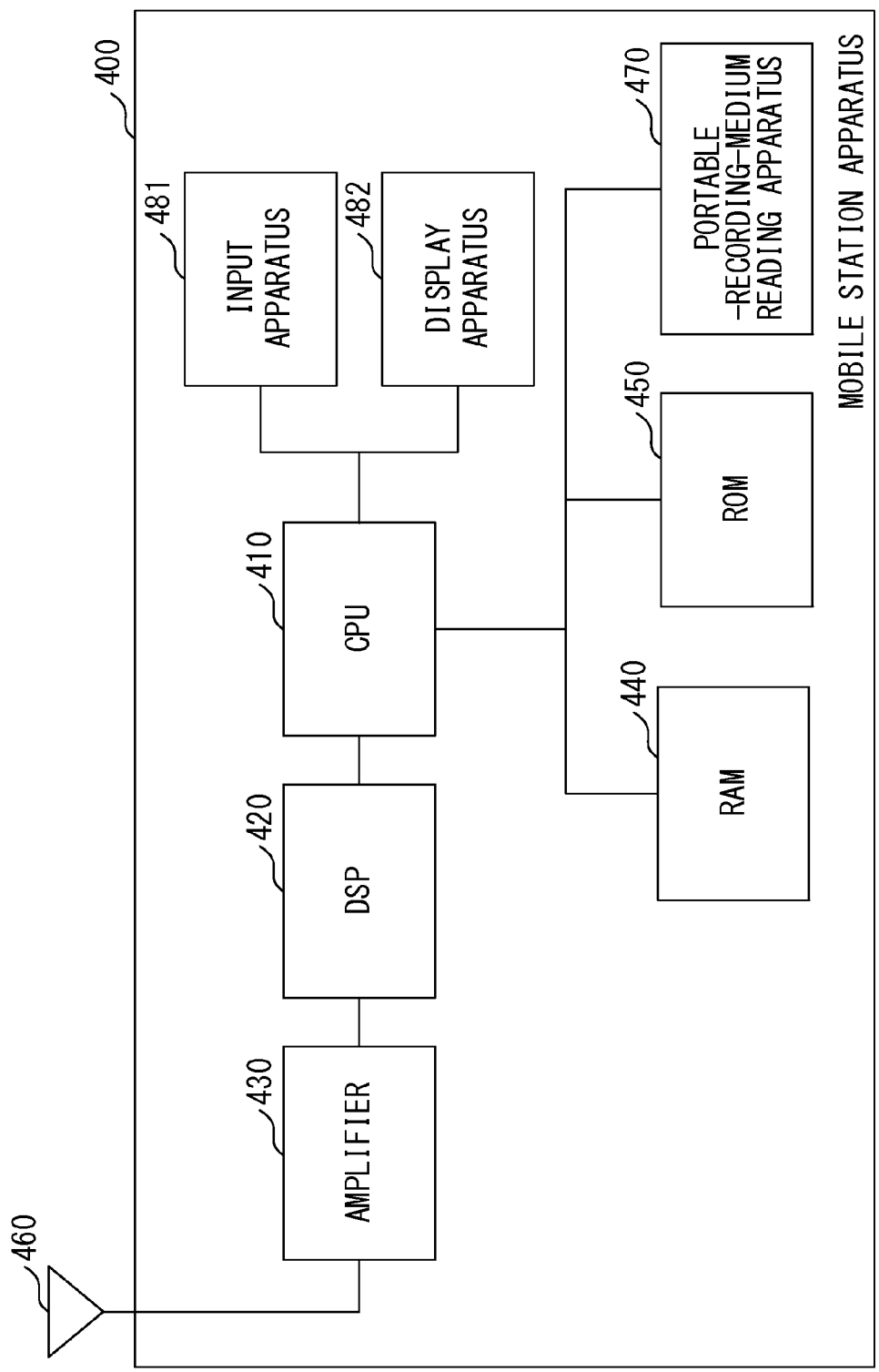
FIG. 6 is an exemplary hardware configuration diagram of a mobile station apparatus in accordance with a first embodiment.

FIG. 6 is an exemplary hardware configuration diagram of a mobile station apparatus in accordance with the first embodiment.

The processing apparatus 210 depicted in FIG. 5 corresponds to, for example, a CPU 410 of a mobile station apparatus 400 depicted in FIG. 6. The transmission signal multiplexer 220, the radio signal transmitting apparatus 230, the radio signal receiving apparatus 240, and the received signal separator-demodulator 250 correspond to, for example, a DSP 420 and an amplifier 430. The storage device 260 corresponds to, for example, a RAM 440 and a ROM 450. The antenna 270 corresponds to an antenna 460. The portable-recording-medium reading apparatus 280 corresponds to, for example, a portable-recording-medium reading apparatus 470. The input apparatus 291 corresponds to, for example, an input apparatus 481. The display apparatus 292 corresponds to, for example, a display apparatus 482.

With reference to the radio communication system 1, the following will describe an exemplary method used by the base station apparatus 100 to control allocation of component carriers to be used for a communication with the mobile station apparatus 200.

Figure 7:
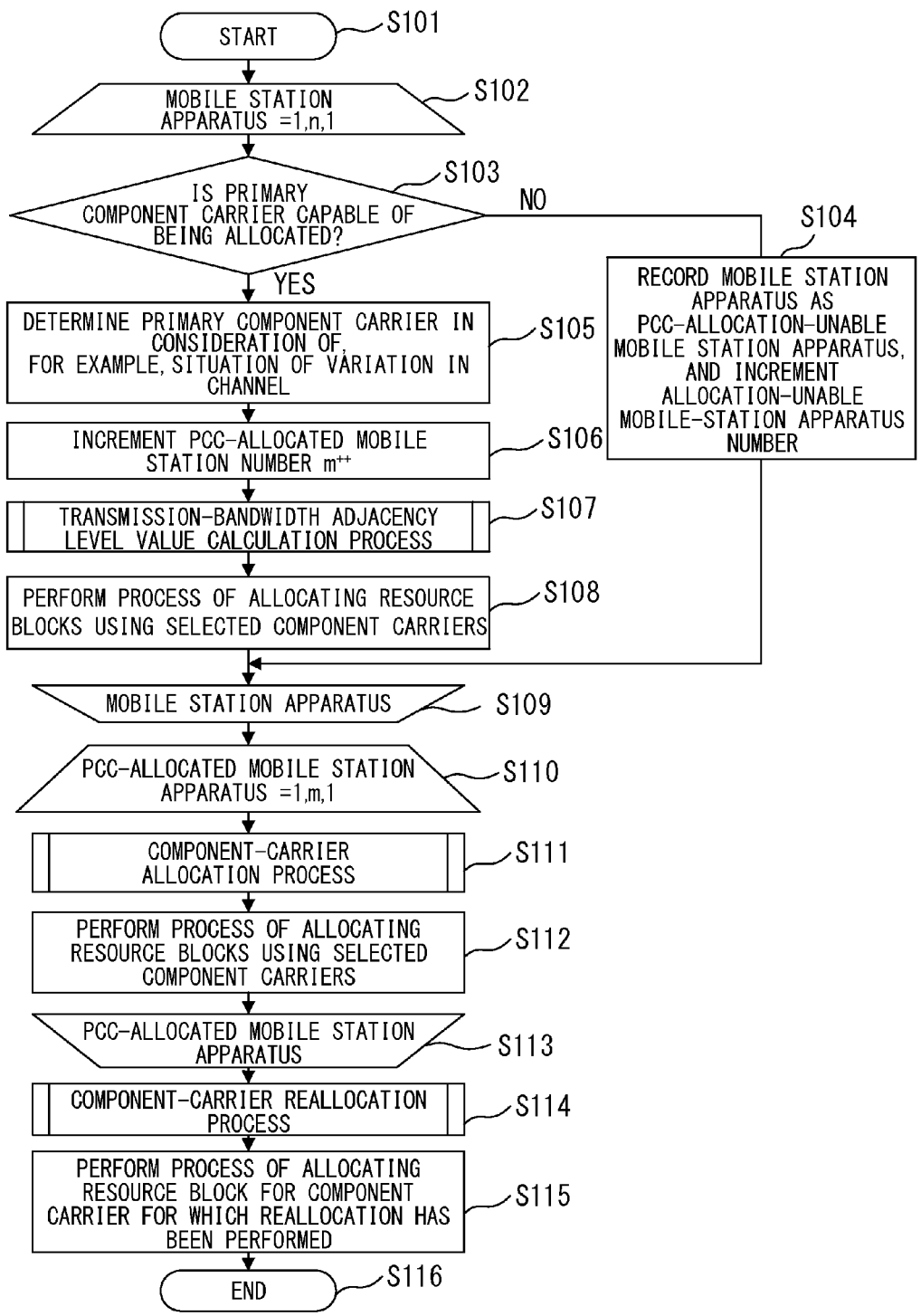
FIG. 7 is an exemplary diagram of a radio-resource allocation controlling process flow in accordance with a first embodiment.

FIG. 7 is an exemplary diagram of a radio-resource allocation controlling process flow in accordance with the first embodiment.

When a radio-resource allocation controlling process starts (step S101), the radio-resource allocation controlling unit 111 performs the processes of steps S102-S109 for each of n mobile station apparatuses 200 that are connection targets of the base station apparatus 100 (n is an arbitrary integer that is one or higher).

In step S103, the radio-resource allocation controlling unit 111 determines whether a component carrier is a Primary Component Carrier (PCC) capable of being allocated to a mobile station apparatus 200. The primary component carrier is a main component carrier used in a communication between the base station apparatus 100 and the mobile station apparatus 200. A radio resource control connection is established for the primary component carrier.

The following will describe an exemplary process of step S103.

Figure 8:
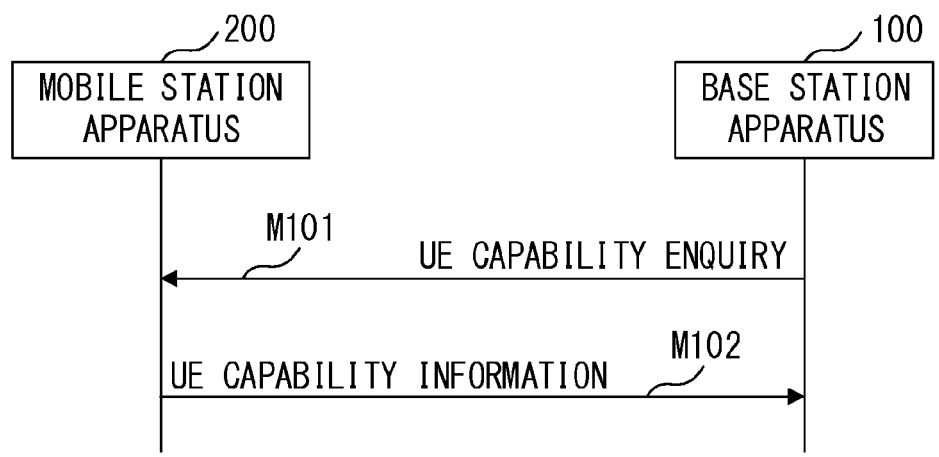
FIG. 8 is an explanatory diagram of transmission and reception of a mobile-station-capability-information message.

FIG. 8 is an explanatory diagram of transmission and reception of a mobile-station-capability-information message. As depicted in FIG. 8, in a radio resource control connection, the base station apparatus 100 transmits a mobile station capability information request (User Equipment (UE) Capability Enquiry) message M101 to a mobile station apparatus 200. Upon receipt of the mobile station capability information request message, the mobile station apparatus 200 transmits a mobile station capability information (UE Capability Information) message M102 to the base station apparatus 100.

FIG. 9 is an exemplary diagram of a mobile station capability message. In the exemplary mobile station capability message depicted in FIG. 9, UE Capability Information-r8, i.e., a structure of mobile station capability information, is indicated in a UE-Capability RAT-Container List illustrated in FIG. 9. In LTE (E-UTRA), UE-EUTRA-Capability defines the UE-Capability RAT-Container List.

FIGS. 10A and 10B are exemplary diagrams of the configuration of UE-EUTRA-Capability. As depicted in FIG. 10A, UE-EUTRA-Capability includes physical layer parameters (phyLayerParameters) and radio frequency parameters (rf-Parameters), i.e., types of radio access capability parameters of a mobile station apparatus.

As depicted in FIG. 10A, the physical layer parameters include crossCarrierScheduling-r10, simultaneousPUCCH-PUSCH-r10, multiClusterPUSCH-WithinCC-r10, and nonContiguousUL-RA-WithinCC-List-r10. crossCarrierScheduling-r10 defines whether a mobile station apparatus supports cross-carrier scheduling. simultaneousPUCCH-PUSCH-r10 defines whether a mobile station apparatus supports simulcast of a Physical Uplink Shared Channel (PUSCH) and a Physical Uplink Control Channel (PUSCH). multiClusterPUSCH-WithinCC-r10 defines whether multi-cluster PUSCH is supported in one component carrier. nonContiguousUL-RA-WithinCC-List-r10 defines whether a radio frequency of a mobile station apparatus supports allocation of discontinuous mobile-station resources in one component carrier.

As depicted in FIG. 10B, the frequency parameters include supportedBandCombination, which defines carrier aggregation supported by the mobile station apparatus and Multiple-Input and Multiple-Output (MIMO) capability. supportedBandCombination includes CA-BandwidthClass-r10, which indicates the maximum number of component carriers each mobile station apparatus is capable of dealing with, and the maximum number of resource blocks each mobile station apparatus is capable of dealing with.

The radio-resource allocation controlling unit 111 receives data on mobile station capability information from the control data processing unit 113. The radio-resource allocation controlling unit 111 obtains, from the received mobile station capability information, data on a frequency band and component carrier that the mobile station apparatus 200 is capable of dealing with.

The radio-resource allocation controlling unit 111 extracts, from the radio resource management file 161, component carriers that have not been allocated to the mobile station apparatus 200 from among the component carriers of the frequency band that the base station apparatus 100 is capable of allocating.

The radio-resource allocation controlling unit 111 determines whether the component carriers that have not been allocated to the mobile station apparatus 200 include a component carrier that the mobile station apparatus 200 is capable of dealing with (step S103).

When it is determined in step S103 that a primary component carrier capable of being allocated to the mobile station apparatus 200 is not present ("NO" in step S103), the radio-resource allocation controlling unit 111 shifts to the process of step S104.

In step S104, the radio-resource allocation controlling unit 111 records the mobile station apparatus 200 as a mobile station apparatus to which a primary component carrier has been unable to be allocated (an allocation-unable mobile station apparatus). The radio-resource allocation controlling unit 111 increments an allocation-unable mobile-station apparatus number that starts with 0. Then, the radio-resource allocation controlling unit 111 ends the processes of steps S102-S109 on the mobile station apparatus 200 and performs the processes of steps S102-S109 on a subsequent mobile station apparatus 200.

When it is determined in step S103 that a primary component carrier capable of being allocated to the mobile station apparatus 200 is present ("YES" in step S103), the radio-resource allocation controlling unit 111 shifts to the process of step S105. A primary component carrier capable of being allocated is, for example, a component carrier with an available carrier resource.

In step S105, in consideration of, for example, an estimated channel fluctuation situation and a load balance, the radio-resource allocation controlling unit 111 determines a primary component carrier to be allocated to the mobile station apparatus 200.

In a radio resource control connection established for the primary component carrier, a Radio Resource Control Reconfiguration (RRC Reconfiguration) message transmitted from the base station apparatus 100 to the mobile station apparatus 200 may include a measurement configuration message. The measurement configuration message includes a measurement object list indicating component carrier frequencies that are measurement objects, and reporting configurations indicating a time at which a result of a measurement is reported to the base station apparatus 100. The radio resource control reconfiguration message includes a list of component carriers that the base station apparatus 100 is capable of allocating, which are numbered in an ascending order with the component carrier with the lowest frequency band being assigned the lowest number. The mobile station apparatus 200 receives data included in such messages from the base station apparatus 100, and stores the data in the storage device 260 thereof.

In step S106, the radio-resource allocation controlling unit 111 increments a PCC-allocated mobile station apparatus number that starts with 0. The PCC-allocated mobile station apparatus indicates the number of mobile station apparatuses 200 to which a primary component carrier has been allocated.

In step S107, the radio-resource allocation controlling unit 111 performs a transmission-bandwidth adjacency level value calculation process according to the mobile station capability information received from the mobile station apparatus 200.

Figure 11:
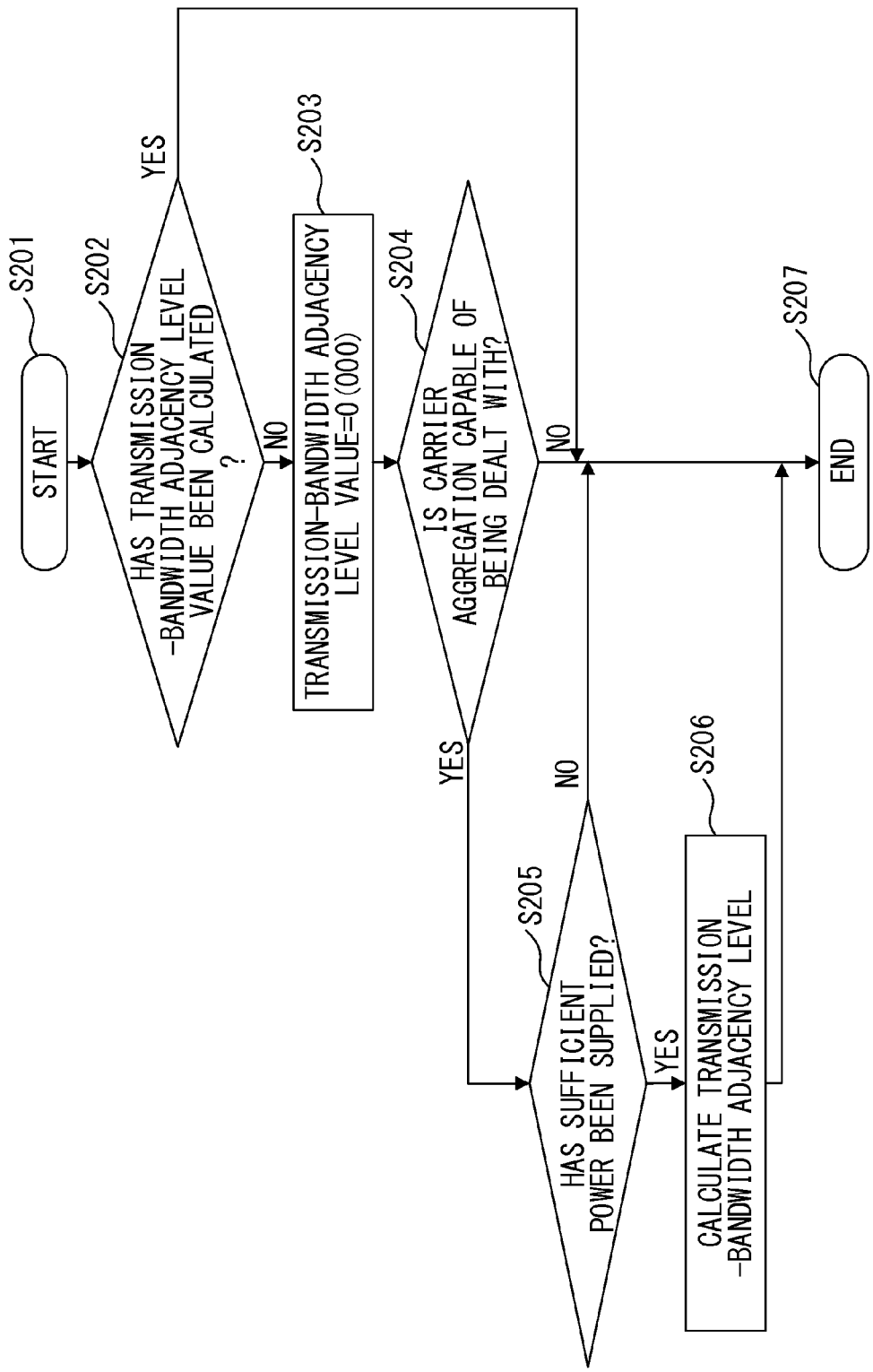
FIG. 11 is an exemplary diagram of a transmission-bandwidth adjacency level value calculation process flow in accordance with a first embodiment.

FIG. 11 is an exemplary diagram of a transmission-bandwidth adjacency level value calculation process flow in accordance with the first embodiment.

When the transmission-bandwidth adjacency level value calculation process starts (step S201), then, in step S202, the radio-resource allocation controlling unit 111 refers to the transmission-bandwidth adjacency-level value management file 162 so as to determine whether a transmission transmission-bandwidth adjacency level value of the mobile station apparatus 200 has been calculated.

When it is determined that a transmission-bandwidth adjacency level value of the mobile station apparatus 200 has been calculated ("YES" in step S202), the radio-resource allocation controlling unit 111 ends the transmission-bandwidth adjacency level value calculation process on the mobile station apparatus 200 (step S207).

When it is determined that a transmission-bandwidth adjacency level value of the mobile station apparatus 200 has not been calculated ("NO" in step S202), the radio-resource allocation controlling unit 111 shifts to the process of step S203.

In step S203, the radio-resource allocation controlling unit 111 sets, as an initial transmission-bandwidth adjacency level value, a value indicating that carrier aggregation is unable to be performed. As will be described hereinafter with reference to FIG. 12, the radio-resource allocation controlling unit 111 sets, for example, 0 to each bit of a three-bit transmission-bandwidth adjacency level value as an initial transmission-bandwidth adjacency level value.

In step S204, the radio-resource allocation controlling unit 111 refers to mobile-station capability information so as to determine whether the mobile station apparatus 200 is an apparatus adapted to carrier aggregation (e.g., an apparatus adapted to LTE-A).

When it is determined that the mobile station apparatus 200 is an apparatus that is not adapted to carrier aggregation ("NO" in step S204), the radio-resource allocation controlling unit 111 ends the transmission-bandwidth adjacency level value calculation process on the mobile station apparatus 200 (step S207).

When it is determined that the mobile station apparatus 200 is an apparatus adapted to carrier aggregation ("YES" in step S204), the radio-resource allocation controlling unit 111 shifts to the process of step S205. In step S205, the radio-resource allocation controlling unit 111 determines whether sufficient power to perform a communication using a plurality of component carriers has been supplied from a battery of the mobile station apparatus 200.

When it is determined that sufficient power to perform a communication using a plurality of component carriers has not been supplied from the battery ("NO" in step S205), the radio-resource allocation controlling unit 111 ends the transmission-bandwidth adjacency level value calculation process on the mobile station apparatus 200 (step S207).

When it is determined that sufficient power to perform a communication using a plurality of component carriers has been supplied from the battery of the mobile station apparatus 200 ("YES" in step S205), the radio-resource allocation controlling unit 111 shifts to the process of step S206.

In step S206, the radio-resource allocation controlling unit 111 refers to mobile station capability information so as to calculate the transmission-bandwidth adjacency level value of the mobile station apparatus 200. That is, the radio-resource allocation controlling unit 111 calculates the transmission-bandwidth adjacency value using data included in mobile-station capability information data and indicating a scenario for carrier aggregation that the mobile station apparatus 200 is capable of dealing with. The data indicating the scenario for carrier aggregation that the mobile station apparatus 200 is capable of dealing with includes data indicating whether continuous component carriers within the same frequency band are capable of being allocated, whether component carriers of different frequency bands are capable of being allocated, and whether discontinuous component carriers within the same frequency band are capable of being allocated.

FIG. 12 is an exemplary diagram of policies on component-carrier allocation indicated by transmission-bandwidth adjacency level values.

In the example depicted in FIG. 12, using data indicating a scenario for carrier aggregation that the mobile station apparatus 200 is capable of dealing with, the radio-resource allocation controlling unit 111 calculates a transmission-bandwidth adjacency level value X (X is an integer that is 0 or higher) consisting of adjacency level data A, B, and C of three bits.

The adjacency level data A, i.e., the first bit, indicates whether continuous component carriers within the same frequency band are capable of being allocated. When continuous component carriers within the same frequency band are capable of being allocated, the radio-resource allocation controlling unit 111 sets 1 as the adjacency level data A. When continuous component carriers within the same frequency band are incapable of being allocated, the radio-resource allocation controlling unit 111 sets 0 as the adjacency level data A.

The adjacency level data B, i.e., the second bit, indicates whether component carriers of different frequency bands are capable of being allocated. When component carriers of different frequency bands are capable of being allocated, the radio-resource allocation controlling unit 111 sets 1 as the adjacency level data B. When component carriers of different frequency bands are incapable of being allocated, the radio-resource allocation controlling unit 111 sets 0 as the adjacency level data B.

The adjacency level data C, i.e., the third bit, indicates whether discontinuous component carriers within the same frequency band are capable of being allocated. When discontinuous component carriers within the same frequency band are capable of being allocated, the radio-resource allocation controlling unit 111 sets 1 as the adjacency level data C. When discontinuous component carriers within the same frequency band are incapable of being allocated, the radio-resource allocation controlling unit 111 sets 0 as the adjacency level data C.

By setting the 3-bit value, the transmission-bandwidth adjacency level value X, that is classified into eight types as depicted in FIG. 12, indicating policies on component-carrier allocation is calculated. As described above, transmission-bandwidth adjacency level value 0 (000), which indicates that carrier aggregation is incapable of being performed, is set as an initial transmission-bandwidth adjacency level value X.

After a transmission-bandwidth adjacency level value is calculated in step S206, the radio-resource allocation controlling unit 111 ends the processing series of calculating a transmission-bandwidth adjacency level value for the mobile station apparatus 200 (step S207).

When the transmission-bandwidth adjacency level value calculation process ends in step S107 in FIG. 7, the radio-resource allocation controlling unit 111 records a calculated transmission-bandwidth adjacency level value in the transmission-bandwidth adjacency-level value management file 162.

In step S108 in FIG. 7, the radio-resource allocation controlling unit 111 performs a process of allocating resource blocks using component carriers allocated in step S105.

After the processes of steps S102-S109 are performed for each of n mobile station apparatuses 200 that are connection targets of the base station apparatus 100, the radio-resource allocation controlling unit 111 performs the processes of steps S110-S113 for each of m (m is an arbitrary integer that is one or higher) mobile station apparatuses 200 to which a primary component carrier has been allocated (PCC-allocated mobile station apparatuses).

In step S111, the radio-resource allocation controlling unit 111 performs a component-carrier allocation process for a mobile station apparatus 200.

Figure 13:
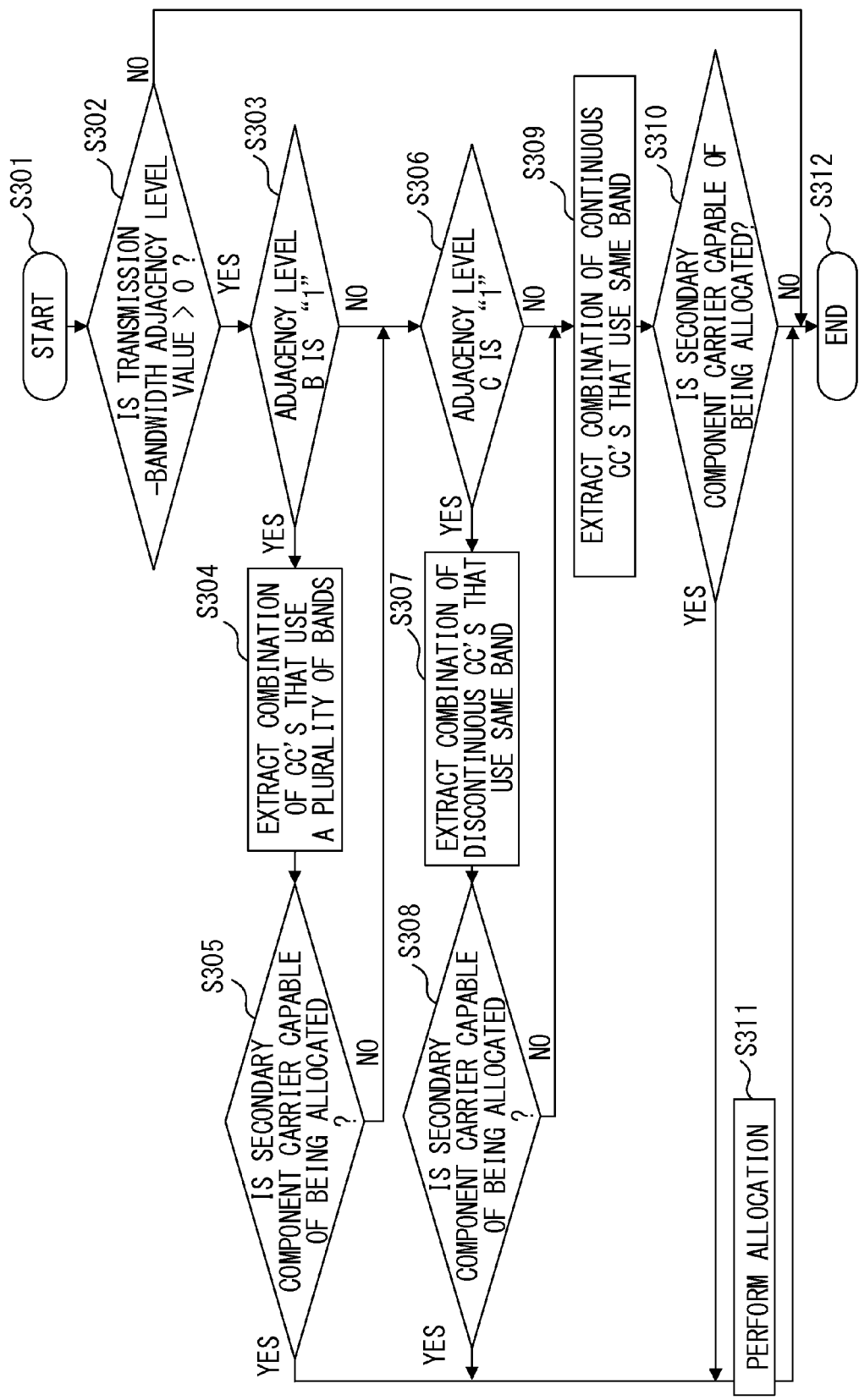
FIG. 13 is an exemplary diagram of a component-carrier allocation process flow in accordance with a first embodiment.

FIG. 13 is an exemplary diagram of a component-carrier allocation process flow in accordance with the first embodiment.

When the component-carrier allocation process starts (step S301), then, in step S302, the radio-resource allocation controlling unit 111 determines whether a transmission-bandwidth adjacency level value of the mobile station apparatus 200 is higher than 0 (step S302). That is, the radio-resource allocation controlling unit 111 determines whether carrier aggregation is capable of being performed for the mobile station apparatus 200.

When it is determined that carrier aggregation is incapable of being performed for the mobile station apparatus 200 ("NO" in step S302), the radio-resource allocation controlling unit 111 ends the component-carrier allocation process on the mobile station apparatus 200 (step S312).

When it is determined that carrier aggregation is capable of being performed for the mobile station apparatus 200 ("YES" in step S302), the radio-resource allocation controlling unit 111 determines whether the adjacency level data B of the transmission-bandwidth adjacency level value is 1 (step S303). That is, the radio-resource allocation controlling unit 111 determines whether the mobile station apparatus 200 is capable of having allocated thereto a component carrier within a frequency band that is different from frequency bands in which allocated primary component carriers are present.

When it is determined that a component carrier within a frequency band that is different from frequency bands of the primary component carriers is incapable of being allocated ("NO" in step S303), the radio-resource allocation controlling unit 111 shifts to the process of step S306.

On the other hand, when it is determined that a component carrier within a frequency band that is different from frequency bands of the primary component carriers is capable of being allocated ("YES" in step S303), the radio-resource allocation controlling unit 111 shifts to the process of step S304.

In step S304, the radio-resource allocation controlling unit 111 refers to the radio resource management file 161 so as to extract a component carrier that is a candidate for a secondary component carrier (SCC). That is, the radio-resource allocation controlling unit 111 extracts, from component carriers that have not been allocated to any mobile station apparatus 200, a component carrier that is capable of being combined with an allocated primary component carrier in such a manner as to satisfy the determination condition of step S303. A secondary component carrier is a component carrier allocated to a mobile station apparatus 200 in addition to a primary component carrier through carrier aggregation.

In a case where a component carrier is extracted in step S304, when a secondary component carrier is capable of being allocated ("YES" in step S305), the radio-resource allocation controlling unit 111 shifts to an allocation execution process in step S311.

In a case where a component carrier is not extracted in step S304, when a secondary component carrier is incapable of being allocated ("NO" in step S305), the radio-resource allocation controlling unit 111 shifts to the process of step S306.

In step S306, the radio-resource allocation controlling unit 111 determines whether the adjacency level data C of the transmission-bandwidth adjacency level value is 1. That is, the radio-resource allocation controlling unit 111 determines whether the mobile station apparatus 200 is capable of having allocated thereto discontinuous component carriers belonging to the same frequency band as the allocated primary component carrier.

When it is determined that discontinuous component carriers belonging to the same frequency band as the primary component carrier are incapable of being allocated ("NO" in step S306), the radio-resource allocation controlling unit 111 shifts to the process of step S309.

When it is determined that discontinuous component carriers belonging to the same frequency band as the primary component carrier are capable of being allocated ("YES" in step S306), the radio-resource allocation controlling unit 111 shifts to the process of step S307.

In step S307, the radio-resource allocation controlling unit 111 refers to the radio resource management file 161 so as to extract, as a secondary component carrier and from component carriers that have not been allocated to any mobile station apparatus 200, a component carrier that is capable of being combined with an allocated primary component carrier in such a manner as to satisfy the determination condition of step S306.

In a case where a component carrier is extracted in step S307, when a secondary component carrier is capable of being allocated ("YES" in step S308), the radio-resource allocation controlling unit 111 shifts to the allocation execution process in step S311.

In a case where a component carrier is not extracted in step S307, when a secondary component carrier is incapable of being allocated ("NO" in step S308), the radio-resource allocation controlling unit 111 shifts to the process of step S309.

In step S309, the radio-resource allocation controlling unit 111 refers to the radio resource management file 161 so as to extract a component carrier that is a candidate for a secondary component carrier. That is, the radio-resource allocation controlling unit 111 extracts, from component carriers that have not been allocated to any mobile station apparatus 200, component carriers that are continuous with the allocated primary component carriers within the same frequency band.

In a case where a component carrier is extracted in step S309, when a secondary component carrier is capable of being allocated ("YES" in step S310), the radio-resource allocation controlling unit 111 shifts to the allocation execution process in step S311.

In step S311, in consideration of, for example, an estimated channel fluctuation situation and a load balance, the radio-resource allocation controlling unit 111 determines a secondary component carrier capable of being optimally combined with a primary component carrier from among the extracted candidates for a secondary component carrier. Then, the radio-resource allocation controlling unit 111 ends the component-carrier allocation process, i.e., the processing series depicted in FIG. 13.

In a case where a component carrier is not extracted in step S309, when a secondary component carrier is incapable of being allocated ("NO" in step S310), the radio-resource allocation controlling unit 111 ends the component-carrier allocation process, i.e., the processing series depicted in FIG. 13. That is, the radio-resource allocation controlling unit 111 ends the processing series depicted in FIG. 13 without allocating a secondary component carrier to the mobile station apparatus 200.

As is clear from the descriptions above, use of the transmission-bandwidth adjacency level value in accordance with any of the embodiments enables a combination of component carriers capable of being allocated to a mobile station apparatus to be efficiently extracted from frequency bands and component carriers that a base station apparatus is capable of allocating. Accordingly, use of the transmission-bandwidth adjacency level value in accordance with any of the embodiments enables allocation of component carriers to mobile station apparatuses to be determined quickly and efficiently.

In step S112 in FIG. 7, the radio-resource allocation controlling unit 111 performs a process of allocating resource blocks using the component carriers allocated in step S111.

After the processes of steps S102-S113 are performed for each of m mobile station apparatuses 200 that are PCC-allocated mobile station apparatuses, the radio-resource allocation controlling unit 111 shifts to a component-carrier reallocation process in step S114.

FIG. 14 is an exemplary diagram of a component-carrier reallocation process flow in accordance with the first embodiment.

When the component-carrier reallocation process starts (step S401), the radio-resource allocation controlling unit 111 performs the processes of steps S402-S409 for each of the mobile station apparatuses 200 recorded in step S103 as a mobile station apparatus to which a primary component carrier is incapable of being allocated. For convenience, a mobile station apparatus 200 recorded in step S103 as a mobile station apparatus to which a primary component carrier is incapable of being allocated will hereinafter be referred to as an allocation-unable mobile station apparatus 200.

In step S403, the radio-resource allocation controlling unit 111 determines whether a mobile station apparatus 200 is present to which a component carrier that the allocation-unable mobile station apparatus 200 is capable of dealing with has been allocated as a secondary component carrier. For convenience, a mobile station apparatus 200 to which a component carrier that an allocation-unable mobile station apparatus 200 is capable of dealing with has been allocated as a secondary component carrier will hereinafter be referred to as an allocation-completed mobile station apparatus 200.

When it is determined in step S403 that an allocation-completed mobile station apparatus 200 is not present ("NO" in step S403), the radio-resource allocation controlling unit 111 shifts to the process of step S409. The radio-resource allocation controlling unit 111 performs the processes of steps S402-S409 for the allocation-unable mobile station apparatus 200 without allocating a component carrier.

When it is determined in step S403 that an allocation-completed mobile station apparatus 200 is present ("YES" in step S403), the radio-resource allocation controlling unit 111 shifts to the process of step S404.

In steps S404-S406, processing is performed for each allocation-completed mobile station apparatus 200 to which a component carrier that the allocation-unable mobile station apparatus 200 is capable of dealing with has been allocated as a secondary component carrier.

In step S405, the radio-resource allocation controlling unit 111 determines whether a secondary component carrier allocated to an allocation-completed mobile station apparatus 200 is capable of being replaced with another component carrier.

In particular, the radio-resource allocation controlling unit 111 extracts, from the radio resource management file 161, component carriers that have not been allocated to any mobile station apparatus 200 from among the component carriers of the frequency band that the base station apparatus 100 is capable of allocating. The radio-resource allocation controlling unit 111 also refers to the mobile station capability information management file 163 so as to obtain a component carrier of a frequency band that an allocation-completed mobile station apparatus 200 is capable of dealing with. The radio-resource allocation controlling unit 111 determines whether the extracted component carriers that have not been allocated include a component carrier that the allocation-completed mobile station apparatus 200 is capable of dealing with.

When it is determined in step S405 that a component carrier that the allocation-completed mobile station apparatus 200 is capable of dealing with is not present ("NO" in step S405), the radio-resource allocation controlling unit 111 shifts to the process of step S406.

In step S405, the radio-resource allocation controlling unit 111 ends the processing on the allocation-completed mobile station apparatus 200. Then, the radio-resource allocation controlling unit 111 returns to the process of step S404 and performs the process of step S405 on another allocation-completed mobile station apparatus 200.

When it is determined in step S405 that a component carrier that the allocation-completed mobile station apparatus 200 is capable of dealing with is present ("YES" in step S405), the radio-resource allocation controlling unit 111 shifts to the process of step S407.

In step S407, the radio-resource allocation controlling unit 111 reallocates a secondary component carrier to the allocation-completed mobile station apparatus 200. That is, the radio-resource allocation controlling unit 111 replaces the secondary component carrier of the allocation-completed mobile station apparatus 200 with a component carrier extracted in step S405, i.e., a component carrier that has not been allocated and that the allocation-completed mobile station apparatus 200 is capable of dealing with.

In step S408, the radio-resource allocation controlling unit 111 allocates the component carrier that has become unused as a result of the reallocation process in step S407 as a primary component carrier of an allocation-unable mobile station apparatus 200.

When the processes of steps S402-S409 have been performed for all allocation-unable mobile station apparatuses 200, the radio-resource allocation controlling unit 111 ends the component-carrier reallocation process, i.e., the processing series depicted in FIG. 14 (step S410).

When the component-carrier reallocation process ends in step S114 of FIG. 7, then, in step S115, the radio-resource allocation controlling unit 111 performs a process of allocating resource blocks using the component carriers allocated in step S114.

When the resource-block allocation process ends in step S115 of FIG. 7, the radio-resource allocation controlling unit 111 ends the radio-resource allocation controlling process, i.e., the processing series depicted in FIG. 7 (step S116).

The radio-resource allocation controlling process series described above with reference to FIGS. 7-14 may be repeatedly performed on a predetermined time cycle. In the repetitive performing of the radio-resource allocation controlling process series, the processes of steps S103-S105 are skipped for mobile station apparatuses 200 to which a primary component carrier has already been allocated. The transmission-bandwidth adjacency level value calculation process in step S107 is skipped for a mobile station apparatus 200 for which a transmission-bandwidth adjacency level value has been calculated. In the component-carrier allocation process in step S111, a secondary component carrier may be determined in consideration of a radio communication quality for each component carrier.

In the manner described above, repeatedly performing the radio-resource allocation controlling process series described above may control component carriers of frequency bands that the base station apparatus 100 is capable of allocating, in a manner such that the component carriers are able to be optimally allocated in accordance with the communication capabilities of the individual mobile station apparatuses 200.

As described above, according to the radio communication system in accordance with the first embodiment, the base station apparatus may control allocation of radio resources in accordance with the communication capability of each connection-target mobile station apparatus, i.e., in accordance with whether the mobile station apparatus is capable of performing carrier aggregation.

According to the radio communication system in accordance with the first embodiment, the base station apparatus may control allocation of a plurality of component carriers in consideration of a scenario for carrier aggregation that a connection-target mobile station apparatus is capable of dealing with.

In addition, according to the radio communication system in accordance with the first embodiment, the base station apparatus may perform a process of reallocating component carriers to other mobile station apparatuses so as to perform allocation control for a mobile station apparatus to which a component carrier has not been allocated.

Second Embodiment

As described above with reference to FIGS. 7-14, in the first embodiment, the base station apparatus 100 calculates the transmission-bandwidth adjacency level value of each mobile station apparatus 200.

In the meantime, each mobile station apparatus 200 may calculate a transmission-bandwidth adjacency level value.

In the second embodiment, the controlling unit 211 of the mobile station apparatus 200 reads data on mobile station capability information of the mobile station apparatus 200 from the mobile station capability information file 262 within the storage device 260. In a process similar to the process of step S206 of FIG. 11, the controlling unit 211 calculates transmission-bandwidth adjacency level values classified into eight types as depicted in FIG. 12 and indicating policies on component-carrier allocation.

For example, as illustrated in FIG. 8, a mobile station apparatus 200 receives a mobile-station capability enquiry (UE Capability Enquiry) message M101 from the base station apparatus 100 through a radio resource control connection. The mobile station apparatus 200 transmits a mobile station capability information (UE capability information) message M102 that includes calculated transmission-bandwidth adjacency level value data to the base station apparatus 100.

A radio resource controlling process based on the radio communication system in accordance with the second embodiment may be similar to the process of the first embodiment described above, other than the processes that the mobile station apparatus 200 calculates and transmits a transmission-bandwidth adjacency level value to the base station apparatus 100.

The radio communication system in accordance with the second embodiment provides an advantage similar to the advantage of the radio communication system in accordance with the first embodiment described above. The radio communication system in accordance with the second embodiment may decrease the processing burden on a base station apparatus to which many mobile station apparatuses are connected, and may achieve an enhanced processing speed of the base station apparatus, and decreased complexity of the circuit configuration.

Third Embodiment

As described above, in the first embodiment, the base station apparatus 100 calculates a transmission-bandwidth adjacency level value of each mobile station apparatus 200. In the second embodiment, each mobile station apparatus 200 calculates and transmits a transmission-bandwidth adjacency level value thereof to the base station apparatus 100.

Meanwhile, the transmission-bandwidth adjacency level value of a mobile station apparatus 200 may be stored in the mobile station capability information file 262 of the storage device 260 during the process of fabricating the mobile station apparatus 200. Data on the transmission-bandwidth adjacency level value stored in the mobile station capability information file 262 may be rewritten after the mobile station apparatus 200 starts to be operated.

Figure 15:
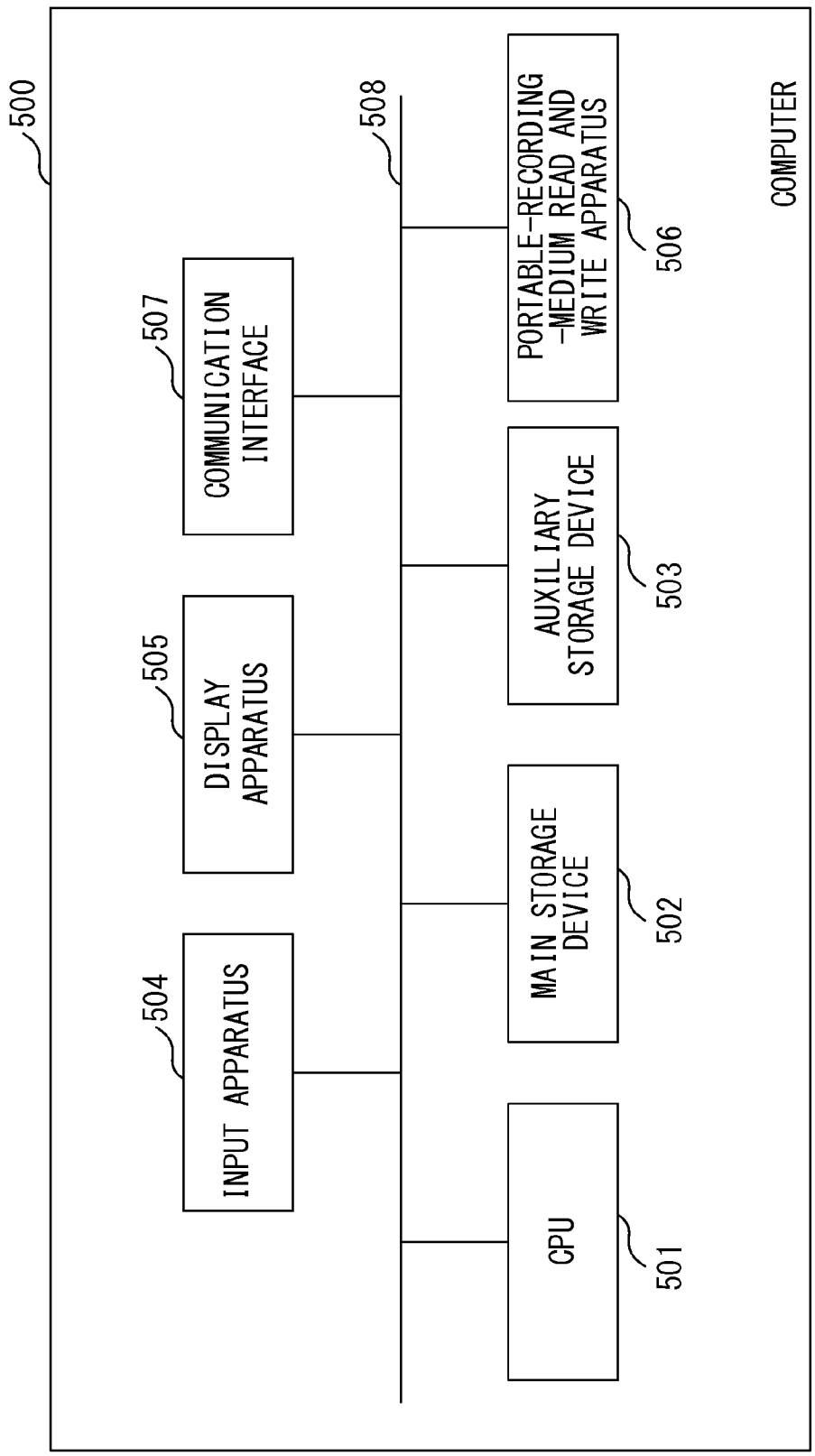
FIG. 15 is an exemplary hardware configuration diagram of a computer.

In the third embodiment, an arbitrary calculation processing apparatus as depicted in FIG. 15, e.g., a computer, calculates the transmission-bandwidth adjacency level value of a mobile station apparatus 200 using data on mobile station capability information of the mobile station apparatus 200. Data on the mobile station capability information used for the calculation is the data described above indicating a scenario for carrier aggregation that the mobile station apparatus 200 is capable of dealing with.

FIG. 15 is an exemplary hardware configuration diagram of a computer.

As depicted in FIG. 15, a computer 500 includes a Central Processing Unit (CPU) 501, i.e., an exemplary processor, a main storage device 502 such as a RAM, and an auxiliary storage device 503 such as a hard disk drive. The computer 500 also includes an input apparatus 504 such as a keyboard or a mouse, and a display apparatus 505 such as a liquid crystal display. In addition, the computer 500 includes a portable-recording-medium read and write apparatus 506 that writes data to and reads data from a portable recording medium such as a flash memory, and a communication interface 507 to be connected to a communication network such as the Internet. The elements 501-507 included in the computer 500 are connected to each other by a bus 508.

Data on mobile station capability information of the mobile station apparatus 200 may be input via the input apparatus 504. Alternatively, the CPU 501 may read data on mobile station capability information of the mobile station apparatus 200 from a portable recording medium via the portable-recording-medium read and write apparatus 506. The data on mobile station capability information that has been input or read is stored in the main storage device 502. Using data on mobile station capability information stored in the main storage device 502, the CPU 501 calculates a transmission-bandwidth adjacency level value in accordance with the embodiment described above with reference to FIGS. 11 and 12. The calculated transmission-bandwidth adjacency level value may be displayed on the display apparatus 505.

Together with data on mobile station capability information, data on the transmission-bandwidth adjacency level value calculated by the CPU 501 may be recorded in the mobile station capability information file 262 during the process of fabricating the mobile station apparatus 200.

Together with data on mobile station capability information, data on the transmission-bandwidth adjacency level value calculated by the CPU 501 may be stored in a portable recording medium such as a flash memory via the portable-recording-medium read and write apparatus 506. The controlling unit 211 reads the data recorded in the portable recording medium via the portable-recording-medium reading apparatus 280. For example, the controlling unit 211 reads data on mobile station capability information and on a transmission-bandwidth adjacency level value recorded in the portable recording medium. The controlling unit 211 updates data within the mobile station capability information file 262 with these pieces of read data.

The radio communication system in accordance with the third embodiment provides an advantage similar to the advantage of the radio communication system in accordance with the first embodiment described above. The radio communication system in accordance with the third embodiment may decrease the processing burdens on a base station apparatus and mobile station apparatuses, and may achieve enhanced processing speeds of the base station apparatus and the mobile station apparatuses, and decreased complexity in the circuit configurations.

Fourth Embodiment

In the first to third embodiments, transmission-bandwidth adjacency level values are calculated according to data indicating a scenario for carrier aggregation that the mobile station apparatus 200 is capable of dealing with. As described above, the data indicating the scenario for carrier aggregation that the mobile station apparatus 200 is capable of dealing with includes data indicating whether continuous component carriers within the same frequency band are capable of being allocated, whether component carriers of different frequency bands are capable of being allocated, and whether discontinuous component carriers within the same frequency band are capable of being allocated.

By contrast, a component-carrier allocation request of individual mobile station apparatuses 200 may be reflected in transmission-bandwidth adjacency level values.

In a radio communication system in accordance with the fourth embodiment, the mobile station apparatus 200 obtains component-carrier allocation request information as a portion of mobile station capability information (UE capability information).

Component-carrier allocation request information is, for example, a policy on component-carrier allocation requested by the mobile station apparatus 200.

The policy on component-carrier allocation is represented by, for example, two-bit data in accordance with the following classifications. That is, 0 indicates "no allocation request" and 1 indicates "request for allocation of a plurality of component carriers within the same frequency band". 2 indicates "request for allocation of a plurality of component carriers of different frequency bands", and 3 indicates "request for allocation of discontinuous component carriers within the same frequency band".

A combination of requested frequency bands, requested component carriers, and request for the number of Multiple-Input and Multiple-Output (MIMO) streams may be added to component-carrier allocation request information.

A combination of requested frequency bands may be expressed by data of a predetermined bit count in accordance with the number of combinations of frequency bands prepared in advance. For example, each combination of frequency bands prepared in advance is assigned a corresponding number. A correlation between a combination of frequency bands prepared in advance and an assigned number is shared between the mobile station apparatus 200 and the base station apparatus 100 in advance. In regard to component-carrier allocation request information related to combinations of requested frequency bands indicates, in one example, "no request for combination" is expressed as 0, and each "combination of requested frequency bands" is expressed as a corresponding number.

A requested component carrier may be represented by data of a predetermined bit count in accordance with the number of component carriers that the mobile station apparatus 200 is capable of dealing with. For example, all component carriers that the mobile station apparatus 200 is capable of dealing with are assigned a number in an ascending order with the component carrier with the lowest frequency band being assigned the lowest number. A correlation between a component carrier and an assigned number is shared between the mobile station apparatus 200 and the base station apparatus 100 in advance. In regard to component-carrier allocation information related to requested component carriers indicates, in one example, "no request for component carrier" is expressed as 0, and each "requested component carrier" is expressed as a corresponding assigned number.

A number of MIMO streams that are requested may be expressed by data of a predetermined bit count in accordance with the number of antennas of the mobile station apparatus 200. In regard to component-carrier allocation request information related to the number of MIMO streams that are requested, in one example, "no request" is expressed as 0, and the number of used antennas that are requested is expressed as "the number of MIMO streams that are requested".

A mobile station apparatus 200 transmits component-carrier allocation request information to the base station apparatus 100.

Figure 16:
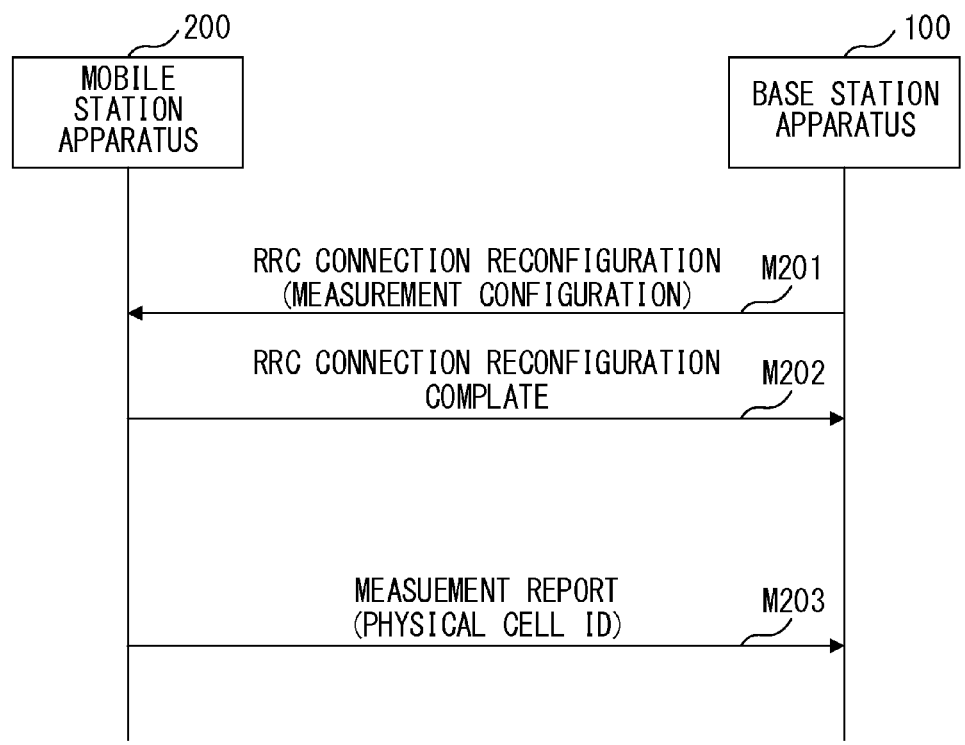
FIG. 16 is an explanatory diagram of an exemplary process of determining and transmitting component-carrier allocation request information.

FIG. 16 is an explanatory diagram of an exemplary process of determining and transmitting component-carrier allocation request information.

As depicted in FIG. 16, in a radio resource control connection, the base station apparatus 100 transmits a radio resource control connection reconfiguration (RRC Control Connection Reconfiguration) message M201 to the mobile station apparatus 200. The radio resource control connection reconfiguration message M201 includes a Measurement Configuration message.

The measurement configuration message includes a list of measurement objects indicating the frequencies of measurement-object component carriers, and a list of reporting configurations indicating a time at which a result of a measurement is reported to the base station apparatus 100. The radio resource control reconfiguration message includes a list of component carriers that the base station apparatus 100 is capable of allocating, which are numbered in ascending order with the component carrier with the lowest frequency band being assigned the lowest number. Data included in those messages is stored in the storage device 260.

The mobile station apparatus 200 transmits a radio resource control reconfiguration completion (RRC Connection Reconfiguration Complete) message M202 to the base station apparatus 100.

The control data processing unit 213 measures signal levels of individual component carriers of cells around a mobile station apparatus 200. Alternatively, the control data processing unit 213 may measure signal levels of component carriers of a measurement-object list included in the measurement configuration message. The measured signal levels include, for example, Reference Signal Received Power (RSRP) and Reference Signal Received Quality (RSRP).

The controlling unit 211 refers to the measured signal levels of individual components so as to determine a combination of component carriers having a high signal level as a policy on requested component-carrier allocation. The controlling unit 211 determines a component carrier having a high signal level from among the signal levels of the measured components as a requested component carrier (secondary component carrier).

The mobile station apparatus 200 transmits a radio quality measurement report (Measurement Report) message M203 that includes determined component-carrier allocation information to the base station apparatus 100.

Using a transmission-bandwidth adjacency level value reflecting the component-carrier allocation request information received by the mobile station apparatus 200, the base station apparatus 100 performs control for allocating component carries to mobile station apparatuses 200.

A specific process flow of the radio-resource allocation control in accordance with the fourth embodiment may be similar to the process flow of the radio-resource allocation control in accordance with the first embodiment described above with reference to FIGS. 7-14, except for adding the processes bellow.

In the process of determining a primary component carrier in step S105, a primary component carrier may be determined according to a request for primary-component-carrier allocation indicated by component-carrier allocation request information in addition to the channel fluctuation situation and the like.

In the transmission-bandwidth adjacency level value calculation process in step S107, a transmission-bandwidth adjacency level value is calculated that reflects component-carrier allocation request information.

In particular, in step S206, at a higher-order byte than adjacency level data A, B, and C indicating scenarios for carrier aggregation that a mobile station apparatus 200 is capable of dealing with, allocation request data D of a predetermined bit reflecting details of component-carrier allocation request information is added. In the example described above, when, for example, component-carrier allocation request information consists only of a policy on requested allocation of component carriers, the allocation request data D is data of two bits.

In the component-carrier allocation process in step S111, a secondary component carrier is allocated in accordance with a transmission-bandwidth adjacency level value reflecting component-carrier allocation request information.

In particular, when it is determined in step S302 that a transmission-bandwidth adjacency level value is higher than 0 ("YES" in step S302), it is determined, prior to the processes of step S303 and the following steps, whether a component carrier indicated by the allocation request data D is capable of being allocated. When the component carrier indicated by the allocation request data D is capable of being allocated, the flow shifts to step S311, where the component carrier indicated by the allocation request data D is allocated as a secondary component carrier. When the component carrier indicated by the allocation request data D is incapable of being allocated, the flow shifts to step S303 and the following steps, and the allocation process is performed according to the adjacency level data A, B, and C.

In the component-carrier reallocation process in step S114, reallocation processes are performed according to component-carrier allocation request information of an allocation-unable mobile station apparatus 200 and component-carrier allocation request information of an allocation-completed mobile station apparatus 200.

Figure 17:
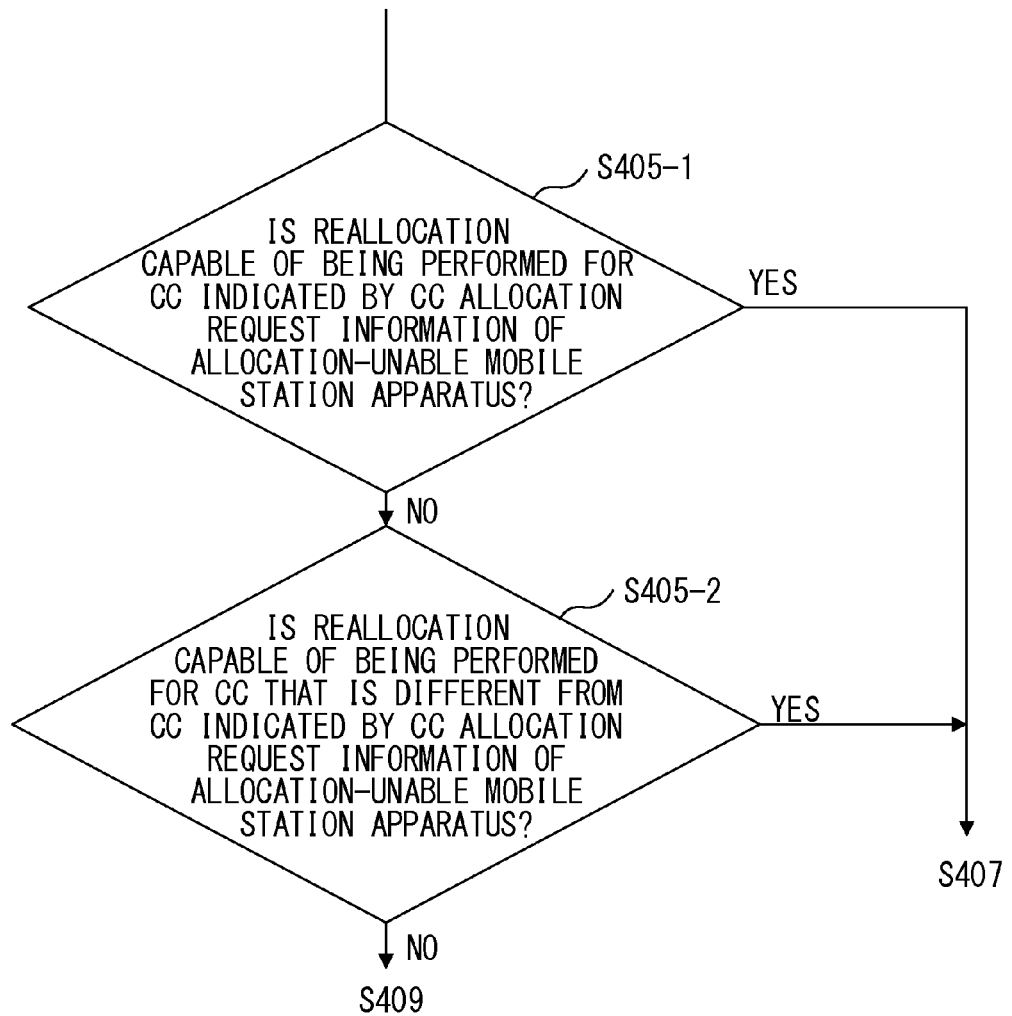
FIG. 17 is an exemplary diagram of a reallocation determination process flow in accordance with a fourth embodiment.

In particular, in the fourth embodiment, instead of the reallocation determination processes in step S405, the reallocation determination process of steps S405-1 and S405-2 depicted in FIG. 17 is performed.

FIG. 17 is an exemplary diagram of a reallocation determination process flow in accordance with the fourth embodiment.

In a first reallocation determination process in step S405-1, it is determined whether a reallocation process is capable of being performed for a component carrier indicated by component-carrier allocation request information of the allocation-unable mobile station apparatus 200. That is, it is determined whether reallocation of a component carrier of another allocation conforming to component-carrier allocation request information of an allocation-completed mobile station apparatus 200 is capable of being performed.

When it is determined in step S405-1 that reallocation is capable of being performed ("YES" in step S405-1), the flow shifts to step S407. In step S407, a component carrier that has not been allocated and that has been determined to be capable of being reallocated is allocated as a new secondary component carrier of the allocation-completed mobile station apparatus 200. In step S408, a component carrier that has become unallocated as a result of the process of step S407 is allocated to an allocation-unable mobile station apparatus 200. That is, a component carrier indicated by component-carrier allocation request information of the allocation-unable mobile station apparatus 200 is allocated to the allocation-unable mobile station apparatus 200.

Meanwhile, when it is determined in step S405-1 that reallocation is incapable of being performed ("NO" in step S405-1), the flow shifts to a second reallocation determination process in step S405-2.

In step S405-2, it is determined whether a component carrier that is different from the component carrier indicated by component-carrier allocation request information and that the allocation-unable mobile station apparatus 200 is capable of dealing with is capable of being reallocated. That is, it is determined whether reallocation of a component carrier of another allocation conforming to component-carrier allocation request information of an allocation-completed mobile station apparatus 200 is capable of being performed.

When it is determined in step S405-2 that reallocation is capable of being performed ("YES" in step S405-2), the flow shifts to step S407. In step S407, a component carrier that has not been allocated and that has been determined to be capable of being reallocated is allocated as a new secondary component carrier of the allocation-completed mobile station apparatus 200. In step S408, a component carrier that has become unallocated as a result of the process of step S407 is allocated to an allocation-unable mobile station apparatus 200. That is, a component carrier other than the component carrier indicated by component-carrier allocation request information and that the allocation-unable mobile station apparatus 200 is capable of dealing with is allocated to the allocation-unable mobile station apparatus 200.

The radio communication system in accordance with the fourth embodiment provides an advantage similar to the advantage of the radio communication system in accordance with the first embodiment described above. The radio communication system in accordance with the fourth embodiment enables a base station apparatus to perform radio-resource allocation control in which component-carrier allocation request of each mobile station apparatus is reflected.

Fifth Embodiment

In the radio communication system in accordance with the fourth embodiment, the base station apparatus 100 receives component-carrier allocation request information from a mobile station apparatus 200 as a portion of mobile station capability information. The base station apparatus 100 calculates a transmission-bandwidth adjacency level value reflecting the received component-carrier allocation information.

By contrast, in one possible configuration, the mobile station apparatus 200 transmits, to the base station apparatus 100, mobile station capability information that includes a transmission-bandwidth adjacency level value reflecting component-carrier allocation request information.

In the radio communication system in accordance with the fifth embodiment, the controlling unit 211 determines information details of component-carrier allocation request information, as described above with reference to FIG. 16. A determined information detail is, for example, a policy on requested allocation of component carriers. The controlling unit 211 calculates a transmission-bandwidth adjacency level value reflecting the determined information details. The calculation process performed by the controlling unit 211 is similar to the calculation process performed by the radio-resource allocation controlling unit 111 in accordance with the fourth embodiment. The controlling unit 211 transmits, to the base station apparatus 100, a mobile-station-capability information (UE capability information) message that includes the transmission-bandwidth adjacency level value reflecting component-carrier allocation request information.

The radio communication system in accordance with the fifth embodiment provides an advantage similar to the advantage of the radio communication system in accordance with the fourth embodiment described above. The radio communication system in accordance with the fifth embodiment may decrease the processing burden on a base station apparatus in calculating a transmission-bandwidth adjacency level value reflecting component-carrier allocation request information. That is, the radio communication system may decrease the processing burden on abase station apparatus to which many mobile station apparatuses are connected, and may achieve an enhanced processing speed of the base station apparatus, and decreased complexity of the circuit configuration.

Sixth Embodiment

The radio resource controlling processes in accordance with the first to fifth embodiments performed by the base station apparatus 100 and the mobile station apparatus 200 may be performed by a computer within each of these apparatuses. That is, a radio resource controlling process in accordance with an embodiment may also be performed by individual computers that are present within the base station apparatus 100 and the mobile station apparatus 200 and that are operated in accordance with a radio resource controlling program defining the procedures of the radio resource controlling process in accordance with such an embodiment.

The hardware configurations of individual computers implemented in the base station apparatus 100 and the mobile station apparatus 200 may be similar to, for example, the computer depicted in FIG. 15.

A radio resource controlling program in accordance with an embodiment is recorded in a portable recording medium such as a magnetic disk, an optical disk, or a magnetic optical disk. The radio resource controlling program recorded in the portable recording medium is read via the portable-recording-medium read and write apparatus 506 and is installed on the auxiliary storage device 503. Alternatively, a radio resource controlling program in accordance with an embodiment may be stored in another computer apparatus (not illustrated) and may be obtained and installed on the auxiliary storage device 503 by the computer 500 via the communication interface 507.

The CPU 501 executes a radio resource controlling program in accordance with an embodiment loaded from the auxiliary storage device 503 into the main storage device 502.

The radio communication system in accordance with the sixth embodiment may provide an advantage similar to the advantage of the radio communication system in accordance with the first to fifth embodiments described above.

Embodiments enable a radio base station apparatus to control allocation of radio resources in accordance with communication capabilities of individual connection-target mobile station apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station apparatus comprising:
a radio signal receiving apparatus that receives a radio signal transmitted from a mobile station apparatus, the radio signal including component-carrier allocation request information of the mobile station apparatus, the component-carrier allocation request information indicating a policy on component-carrier allocation requested by the mobile station apparatus and indicating one of a first request, a second request, a third request and a fourth request, the first request indicating no allocation request, the second request indicating a request for allocation of a plurality of component carriers within one frequency band, the third request indicating a request for allocation of a plurality of component carriers of different frequency bands, the fourth request indicating a request for allocation of discontinuous component carriers within one frequency band;
a radio signal transmitting apparatus; and
a processor that performs a process including:
decoding, from among the radio signal received by the radio signal receiving apparatus, control data that includes the component-carrier allocation request information and information indicating frequency bands that the mobile station apparatus is capable of dealing with and indicating component carriers and scenarios for carrier aggregation;
receiving the decoded control data;
calculating, in accordance with the received control data, a transmissionbandwidth adjacency level value indicating a policy on component-carrier allocation to the mobile station apparatus;
determining, in accordance with the calculated transmission-bandwidth adjacency level value and the component-carrier allocation request information, a component carrier to be allocated to the mobile station apparatus from among the component carriers and the frequency bands that the mobile station apparatus is capable of dealing with; and
generating a transmission signal that includes information indicating the determined component carrier, wherein
the radio signal transmitting apparatus transmits the generated transmission signal to the mobile station apparatus.

2. The base station apparatus according to claim 1, wherein
the radio signal received by the radio signal receiving apparatus includes the transmission-bandwidth adjacency level value, and
the processor determines, in accordance with the transmission-bandwidth adjacency level value included in the radio signal, a component carrier to be allocated to the mobile station apparatus from among the component carriers and the frequency bands that the mobile station apparatus is capable of dealing with.

3. The base station apparatus according to claim 2, wherein
the transmission-bandwidth adjacency level value included in the radio signal received by the radio signal receiving apparatus is calculated by the mobile station apparatus.

4. The base station apparatus according to claim 2, wherein
the transmission-bandwidth adjacency level value included in the radio signal received by the radio signal receiving apparatus is calculated by a calculation processing apparatus that is different from the mobile station apparatus and the base station apparatus.

5. The base station apparatus according to claim 1, wherein
the component-carrier allocation request information is determined by the mobile station apparatus in accordance with a signal level of a radio signal that the mobile station apparatus receives from the base station apparatus.

6. The base station apparatus according to claim 1, wherein
the processor changes, when the component carrier that the mobile station apparatus is capable of dealing with is not allocated to the mobile station due to component-carrier allocation of the component carrier to another mobile station apparatus, the component-carrier allocation to the another mobile station apparatus from the component carrier allocated to the another mobile station apparatus to a component carrier that is not allocated to any mobile station apparatus from among component carriers that the base station apparatus is capable of allocating, and allocates, to the mobile station apparatus, the component carrier that the another mobile station apparatus is not used as a result of the change in the component-carrier allocation.

7. A radio communication system comprising:
a mobile station apparatus; and
a base station apparatus, wherein
the mobile station apparatus includes
a storage device that stores mobile station capability information that includes information indicating a scenario for carrier aggregation that the mobile station apparatus is capable of dealing with,
a first processor that reads mobile station capability information stored by the storage device, that, in accordance with the read mobile station capability information, calculates a transmission-bandwidth adjacency level value indicating a policy on component-carrier allocation to the mobile station apparatus, and that generates a transmission signal that includes the calculated transmission-bandwidth adjacency level value and component-carrier allocation request information of the mobile station apparatus, the component-carrier allocation request information indicating a policy on component-carrier allocation requested by the mobile station apparatus and indicating one of a first request, a second request, a third request and a fourth request, the first request indicating no allocation request, the second request indicating a request for allocation of a plurality of component carriers within one frequency band, the third request indicating a request for allocation of a plurality of component carriers of different frequency bands, the fourth request indicating a request for allocation of discontinuous component carriers within one frequency band, and
a first radio-signal transmitting apparatus that transmits the generated transmission signal to the base station, the base station apparatus includes
a radio signal receiving apparatus that receives the radio signal transmitted from the mobile station apparatus,
a second processor that
decodes, from among the radio signal received by the radio signal receiving apparatus, control data that includes the component-carrier allocation request information, the transmission-bandwidth adjacency level value, and frequency bands and component carriers that the mobile station apparatus is capable of dealing with,
receives the decoded control data,
determines, in accordance with the transmission-bandwidth adjacency level value and the component-carrier allocation request information included in the received control data, a component carrier to be allocated to the mobile station apparatus from among the frequency bands and component carriers that the mobile station apparatus is capable of dealing with, and
generates a transmission signal that includes information indicating the determined component carrier, and
a second radio-signal transmitting apparatus that transmits the generated transmission signal to the mobile station apparatus.

8. The radio communication system according to claim 7, wherein
the first processor
measures a signal level of the radio signal received from the base station apparatus, and
determines the component-carrier allocation request information in accordance with the measured signal level of the radio signal.

9. The radio communication system according to claim 7, wherein
the second processor changes, when the component carrier that the mobile station apparatus is capable of dealing with is not allocated to the mobile station due to component-carrier allocation of the component carrier to another mobile station apparatus, the component-carrier allocation to the another mobile station apparatus from the component carrier allocated to the another mobile station apparatus to a component carrier that is not allocated to any mobile station apparatus from among component carriers that the base station apparatus is capable of allocating, and allocates, to the mobile station apparatus, the component carrier that the another mobile station apparatus is not used as a result of the change in the component-carrier allocation.

10. A radio communication controlling method performed by a base station apparatus comprising:
receiving, by a radio signal receiving apparatus, a radio signal transmitted from a mobile station apparatus, the radio signal including component-carrier allocation request information of the mobile station apparatus, the component-carrier allocation request information indicating a policy on component-carrier allocation requested by the mobile station apparatus and indicating one of a first request, a second request, a third request and a fourth request, the first request indicating no allocation request, the second request indicating a request for allocation of a plurality of component carriers within one frequency band, the third request indicating a request for allocation of a plurality of component carriers of different frequency bands, the fourth request indicating a request for allocation of discontinuous component carriers within one frequency band;
decoding, from among the radio signal received by the radio signal receiving apparatus, control data that includes the component-carrier allocation request information and information indicating frequency bands that the mobile station apparatus is capable of dealing with and indicating component carriers and scenarios for carrier aggregation;
calculating, in accordance with the decoded control data, a transmission-bandwidth adjacency level value indicating a policy on component-carrier allocation to the mobile station apparatus, and
determining, in accordance with the calculated transmission-bandwidth adjacency level value and the component-carrier allocation request information, a component carrier to be allocated to the mobile station apparatus from among the component carriers and the frequency bands that the mobile station apparatus is capable of dealing with;
generating a transmission signal that includes information indicating the determined component carrier; and
transmitting the generated transmission signal to the mobile station apparatus.

11. The radio communication controlling method according to claim 10, wherein
the received radio signal includes the transmission-bandwidth adjacency level value, and
the radio communication controlling method further comprises:
determining, in accordance with the transmission-bandwidth adjacency level value included in the radio signal, a plurality of component carriers to be allocated to the mobile station apparatus from among the component carriers and the frequency bands that the mobile station apparatus is capable of dealing with.

12. The radio communication controlling method according to claim 11, wherein
the transmission-bandwidth adjacency level value included in the radio signal received by the radio signal receiving apparatus is calculated by the mobile station apparatus.

13. The radio communication controlling method according to claim 11, wherein
the transmission-bandwidth adjacency level value included in the radio signal received by the radio signal receiving apparatus is calculated by a calculation processing apparatus that is different from the mobile station apparatus and the base station apparatus.

14. The radio communication controlling method according to claim 10, wherein
the component-carrier allocation request information is determined by the mobile station apparatus in accordance with a signal level of a radio signal that the mobile station apparatus receives from the base station apparatus.

15. The radio communication controlling method according to claim 10, further comprising:
changing, when the component carrier that the mobile station apparatus is capable of dealing with is not allocated to the mobile station due to component-carrier allocation of the component carrier to another mobile station apparatus, the component-carrier allocation to the another mobile station apparatus from the component carrier allocated to the another mobile station apparatus to a component carrier that is not allocated to any mobile station apparatus from among component carriers that the base station apparatus is capable of allocating, and allocating, to the mobile station apparatus, the component carrier that the another mobile station apparatus is not used as a result of the change in the component-carrier allocation.

\* \* \* \* \*